United States Patent
Nakajima et al.

(10) Patent No.: US 7,113,460 B2
(45) Date of Patent: Sep. 26, 2006

(54) OPTICAL DISK HAVING PITS OF DIFFERENT DEPTHS FORMED THEREIN, OPTICAL DISK REPRODUCING APPARATUS FOR REPRODUCING THE OPTICAL DISK, AND METHOD OF TRACKING THE OPTICAL DISK

(75) Inventors: Junsaku Nakajima, Kashihara (JP); Hitoshi Takeuchi, Kitakatsuragi-gun (JP); Masaru Nomura, Nabari (JP); Kenji Ohta, Kitakatsuragi-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 880 days.

(21) Appl. No.: 09/800,082

(22) Filed: Mar. 5, 2001

(65) Prior Publication Data

US 2001/0036134 A1 Nov. 1, 2001

(30) Foreign Application Priority Data

Mar. 6, 2000 (JP) ............................. 2000-059877
Mar. 21, 2000 (JP) ............................. 2000-077694

(51) Int. Cl.
*G11B 7/00* (2006.01)
(52) U.S. Cl. ............................. 369/44.26; 369/44.36
(58) Field of Classification Search ............ 369/44.26, 369/44.41, 44.25, 44.34, 44.29, 44.35, 275.4
See application file for complete search history.

(56) References Cited

U.S. PATENT DOCUMENTS

| | | | |
|---|---|---|---|
| 5,453,969 A | | 9/1995 | Psaltis et al. |
| 5,508,995 A | | 4/1996 | Moriya et al. |
| 5,671,200 A | * | 9/1997 | Yamaguchi et al. ..... 369/44.29 |
| 5,854,779 A | | 12/1998 | Johnson et al. |
| 5,926,446 A | | 7/1999 | Shimizu |
| 6,144,625 A | * | 11/2000 | Kuroda et al. ........... 369/44.25 |
| 6,185,170 B1 | * | 2/2001 | Yoon et al. .............. 369/44.29 |
| 6,226,257 B1 | * | 5/2001 | Morimoto ................ 369/275.4 |
| 6,236,628 B1 | * | 5/2001 | Kim ........................ 369/44.34 |
| 6,339,567 B1 | * | 1/2002 | Shimamoto et al. ..... 369/44.35 |
| 6,343,062 B1 | * | 1/2002 | Furukawa et al. ....... 369/275.4 |
| 6,345,020 B1 | * | 2/2002 | Cho et al. ................ 369/44.32 |

(Continued)

FOREIGN PATENT DOCUMENTS

EP 0 706 174 A1 4/1996

(Continued)

OTHER PUBLICATIONS

G. Bouwhuis, et al.; *Principles of Optical Disc Systems*; GB, Bristol, Adam Hilger Ltd., 1986; pp. 172-173.

*Primary Examiner*—Thang V. Tran
(74) *Attorney, Agent, or Firm*—David G. Conlin; David A. Tucker; Edwards Angell Palmer & Dodge LLP

(57) ABSTRACT

On an optical disk, a string of a plurality of pits having two different depths is formed. Quantity of light reflected from the pit string is detected by a photoreceptor element, and based on the detected quantity of reflected light, a pit depth detecting unit detects depth of each pit. Based on the detected quantity of reflected light, a servo signal generating unit generates a tracking servo signal. An output control unit supplies the generated tracking servo signal when a pit of such depth that is to be reproduced is tracked, and holds and supplies an immediately preceding tracking servo signal when a pit of different depth is being tracked, based on the result of detection by the pit depth detecting unit.

20 Claims, 17 Drawing Sheets

U.S. PATENT DOCUMENTS 6,459,661 B1 * 10/2002 Iwanaga ................. 369/44.26
6,584,049 B1 * 6/2003 Ma et al. ................. 369/44.41
6,760,299 B1 * 7/2004 Nakajima et al. ........ 369/275.4

FOREIGN PATENT DOCUMENTS

| | | |
|---|---|---|
| EP | 0 813 193 A1 | 12/1997 |
| EP | 0 905 683 A2 | 3/1999 |
| EP | 1 067 523 A2 | 1/2001 |
| EP | 1 111 599 A2 | 6/2001 |
| JP | 58-150145 | 9/1983 |
| JP | 58150145 A | 9/1983 |
| JP | 05-205276 | 8/1993 |
| JP | 07-021588 | 1/1995 |
| WO | WO 97/35304 | 9/1997 |

* cited by examiner

———— D1/D2=100/0
-------- D1/D2=80/20
—·—·— D1/D2=60/40

OPTICAL DISK HAVING PITS OF DIFFERENT DEPTHS FORMED THEREIN, OPTICAL DISK REPRODUCING APPARATUS FOR REPRODUCING THE OPTICAL DISK, AND METHOD OF TRACKING THE OPTICAL DISK

TITLE OF THE INVENTION

Optical Disk Having Pits of Different Depths Formed Therein, Optical Disk Reproducing Apparatus for Reproducing the Optical Disk, and Method of Tracking the Optical Disk

BACKGROUND OF THE INVENTION

1. Field of the Invention

The present invention relates to an optical disk having pits, recording marks, grooves, lands and the like for recording information formed partially or entirely on a recording surface, an optical disk reproducing apparatus for reproducing such an optical disk, and to a method of tracking such an optical disk.

2. Description of the Related Art

For an optical disk reproducing apparatus for reproducing information from an optical disk on which information is recorded in advance by pits having recessed and protruded shapes on a disk surface, various proposals have been made as to the tracking servo technique for positioning an optical beam for reproduction on a pit string (track) as disclosed, for example, in Japanese Patent Laying-Open No. 58-1501145.

FIG. 16 is a block diagram of the tracking servo system in accordance with Differential Phase Detection (DPD) method, disclosed in Japanese Patent Laying-Open No. 58-150145.

According to the DPD method, the reflected light beam from the optical disk is received by a photodetector divided into a cross-shape, that is, a photodetector having four areas formed by dividing into two along the radial direction and into two along the tangential direction of the optical disk. A sum signal of outputs of those of the four areas which are positioned at opposing corners is calculated, and a DPD signal indicative of phase difference (time difference) of the sum signals of the opposing areas is detected and used as a servo signal for tracking.

In FIG. 16, the light beam reflected from the optical disk, not shown, is condensed and directed to a photodetector 2. The four areas a, b, c and d respectively output electric signals corresponding to the reflected light quantity. Addition amplifiers 3-1 and 3-2 calculate a sum signal of outputs from areas a and c and a sum signal of outputs from areas b and d, that are positioned at opposing corners of the four areas of photodetector 2, and applies the calculated sum signals to corresponding comparators 5-1 and 5-2, respectively. Comparators 5-1 and 5-2 compare the output signals of addition amplifiers 3-1 and 3-2 with reference signals +Ref1 and +Ref2, respectively, and provide, as outputs, binary signals as a result of comparison.

As the reflected light beam has been diffracted by the pits formed on the optical disk, intensity distribution of the reflected light on the photodetector varies with time, dependent on the positional relation between the optical beam and each pit.

When the optical beam 1 follows just above a pit string, for example, output sum signals (a+c) and (b+d) from the pairs of areas (a, c) and (b, d) at opposing corners of the photodetector positioned above the pits vary in the same manner with time. Therefore, output signals from comparators 5-1 and 5-2 also change in the similar manner at the same timing.

When the optical beam 1 follows positions deviated from just above the pit string, there would be a phase difference (time difference), corresponding to the amount of deviation, between the output sum signals (a+c) and (b+d) of the above described pairs of areas (a, c) and (b, d). Therefore, either one of the sum signals changes first, dependent on the direction of deviation between the optical beam and the pit string.

Therefore, the phase difference (time difference) between the binary signals as the outputs of comparators 5-1 and 5-2 is detected by a phase comparing circuit 7, and a pulse corresponding to the phase difference (time difference) is generated. More specifically, phase comparing circuit 7 compares an R input (output of comparator 5-1) with a V input (output of comparator 5-2), and outputs a pulse of which width corresponds to the phase difference between the two, dependent on which of the inputs is advanced in phase. For example, the pulse of which width corresponds to the amount of delay is output from a U output when the V input lags behind the R input, and output from a D output when the V input is advanced.

The pulse generated in this manner is passed through lowpass filters (LPF) 8-1 and 8-2 to extract only the low frequency components thereof, which are applied to a differential circuit 9. Differential circuit 9 calculates the difference between the low frequency component outputs from lowpass filters 8-1 and 8-2, and supplies the result as a tracking servo signal indicative of the amount and direction of deviation between the optical beam and the pit string (track).

The technique for generating a tracking servo signal other than DPD method described above includes the push-pull method, for example. In the push-pull method, the reflected light beam is divided along the tangential direction of the track, a push-pull signal representing the difference in the quantity of reflected light (difference in intensity distribution) between the inner peripheral side and the outer peripheral side of the disk is calculated, and the signal is used as the tracking servo signal. FIG. 17 is a block diagram of the tracking servo system using the push-pull method.

As already described, when the light beam is directed to a pit string, the reflected light is diffracted by the pit string, dependent on the positional relation between the beam and the pit string. In the push-pull method, the reflected light is divided into two and detected at the inner peripheral side and the outer peripheral side of the optical disk, and a tracking servo signal is generated based on an average light intensity.

Referring to FIG. 17, the reflected light beam 1 is condensed onto a four-split photodetector 2, as in the DPD method shown in FIG. 16. In the push-pull method, however, addition circuits 3-1 and 3-2 add output signals of a pair of areas (a, b) positioned on the inner peripheral side and output signals of a pair of areas (c, d) positioned on the outer peripheral side and outputs the output sum signals (a+b) and (c+d) as the results of addition to a differential circuit 17, not the pair of areas positioned at opposing corners of photodetector 2 as in the DPD method.

Differential circuit 17 calculates the difference between the two sum signals from additional circuit 3-1 and 3-2, and applies the difference as a push-pull signal to a LPF 18. LPF 18 removes high frequency component of each pit from the difference, and extracts the low frequency component, that is, signal component which corresponds to substantial average deviation between the light beam and the pit string, which is supplied as a tracking servo signal. This is the principle of the push-pull method. In the conventional tracking servo control in accordance with the DPD method, push-pull method or the like, polarity of the DPD signal or the push-pull signal may be inverted dependent on the depth of the pit formed on the optical disk, hindering accurate tracking servo control.

SUMMARY OF THE INVENTION

An object of the present invention is to provide an optical disk that enables accurate tracking servo control of even an optical disk having information recorded by pits of different depths, a reproducing apparatus therefor and a tracking method thereof.

Another object of the present invention is to provide an optical disk that enables accurate tracking servo control of even an optical disk on which a plurality of recessed and protruded portions are formed mixed with each other, such that signal representing deviation between the track formed of the recessed and protruded portions and the optical beam is detected with different polarities from each of the recessed and protruded portions, as well as a reproducing apparatus therefor and a tracking method thereof.

According to an aspect, the present invention provides an optical disk reproducing apparatus reproducing information by optical beam irradiation, from an optical disk having information recorded by a string of a plurality of pits formed to have at least two different depths, including a photoreceptor element, a pit depth detecting unit, a servo signal generating unit and an output control unit. The photoreceptor element detects the quantity of the optical beam reflected from the optical disk. The pit depth detecting unit detects the depth of each pit formed on the optical disk, based on the quantity of reflected light detected by the photoreceptor element. The servo signal generating unit detects deviation between the optical beam and the pit string, based on the quantity of reflected light detected by the photoreceptor element, and generates a tracking servo signal for the optical beam to track the pit string. The output control unit controls output of the tracking servo signal generated by the servo signal generating unit, based on the result of detection by the pit depth detecting unit.

According to the present invention, as the pit depth is detected and the output of the tracking servo signal is controlled based on the result of detection, accurate and stable tracking servo control is possible even for an optical disk having pits of different depths existing mixedly.

According to another aspect of the present invention, in an optical disk having a track formed of a plurality of recessed and protruded portions, from which information is reproduced by optical beam irradiation, the recessed and protruded portions being such that a signal indicative of the deviation between the optical beam and the track is detected in different polarity from each of the recessed and protruded portions, the ratio of mixture of the recessed and protruded portions is set such that a tracking servo signal obtained by time-averaging the detected signal in a time period shorter than the response time of tracking servo when the optical beam tracks the track has one of the different polarities.

According to the present invention, the ratio of mixture of the recessed and protruded portions is set such that the tracking servo signal obtained by time-averaging the signal indicative of the deviation between the beam and the track in a time period shorter than the response time of tracking servo comes to have one of the different polarities. Therefore, the tracking servo signal can be obtained without fail, enabling stable tracking servo control.

According to a still further aspect of the present invention, the optical disk reproducing apparatus reproducing information by optical beam irradiation from an optical disk having information recorded by a track formed to have a plurality of recessed and protruded portions includes a photoreceptor element, a signal detecting unit, a servo signal generating unit and a gain changing unit. The photoreceptor element detects the quantity of reflected light beam from the optical disk. The signal detecting unit detects a signal indicative of the deviation between the optical beam and the track, based on the quantity of the reflected light detected by the photoreceptor element. Here, there are such recessed and protruded portions mixedly existing on the optical disk that results in signals having different polarities from each of the recessed and protruded portions. The servo signal generating unit generates the tracking servo signal by time-averaging the detected signal in a time period shorter than the response time of tracking servo when the optical beam tracks. Here, the ratio of mixture of the recessed and protruded portions is set such that the generated tracking servo signal has one of the different polarities. The gain changing unit changes the gain of the tracking servo in accordance with the magnitude of the generated tracking servo.

According to the present invention, as the gain of the tracking servo is variable in accordance with the magnitude of the tracking servo signal obtained by time-averaging the signal indicative of the deviation between the beam and the track in a time period shorter than the response time of the tracking servo, a stable tracking servo can be obtained constantly, enabling stable tracking servo control.

According to a still further aspect of the present invention, the method of tracking an optical disk having a track including a plurality of recessed and protruded portions formed thereon, from which information is reproduced by optical beam irradiation, includes the steps of: detecting quantity of optical beam reflected from the optical disk; and detecting, based on the quantity of the detected reflected light beam, a signal indicative of deviation between the optical beam and the track. Here, there are such recessed and protruded portions mixedly existing on the optical disk that result in signals having different polarities from each of the recessed and protruded portions. The method of tracking further includes the step of generating a tracking servo signal by time-averaging the detected signal in a time period shorter than the response time of the tracking servo when the optical beam tracks. Here, the ratio of mixture of the recessed and protruded portions is set such that the generated tracking servo signal has one of the different polarities. The method of tracking further includes the step of changing gain of the tracking servo, in accordance with the magnitude of the generated tracking servo signal.

According to the present invention, the gain of the tracking servo is variable in accordance with the magnitude of the tracking servo signal obtained by time-averaging the signal indicative of the deviation between the beam and the track in a time period shorter than the response time of the tracking servo, so that a stable tracking servo can be obtained constantly, enabling stable tracking servo control.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

At present, a so-called pit (mark) length recording is generally used for optical disks, in which presence/absence of pits, marks and the like as well as the lengths thereof contain information. It is noted, however, that information of larger amount can be recorded if it becomes possible to provide information in the depth direction of the pits. Such technique has been already proposed by the inventors of the present invention in a co-pending U.S. patent application Ser. No. 09/606282. In the proposed technique, the fact that diffraction pattern resulting from optical interference generated in the pits having recessed and protruded shapes differ dependent on the pit depth is utilized to provide new information to be recorded by the pit depth.

Figure 18:
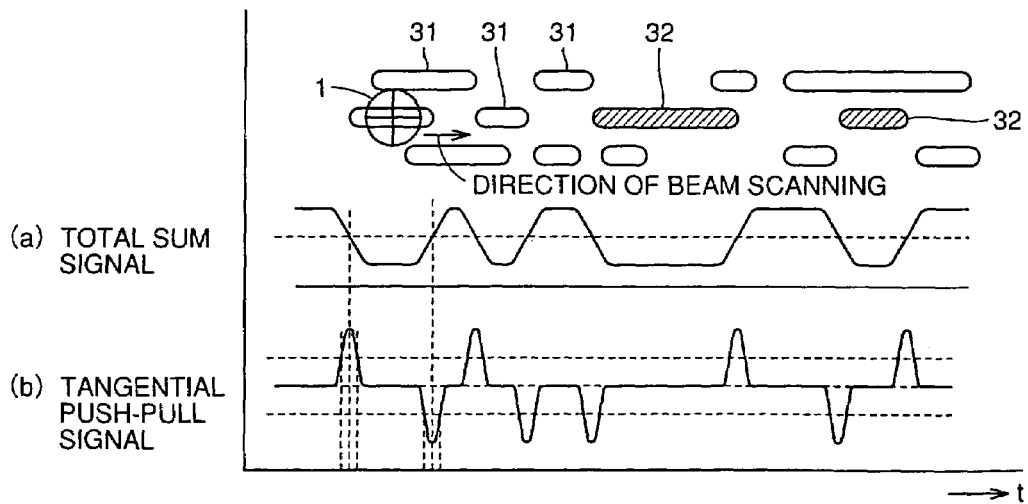
FIG. 18 is a timing chart representing the principle of reproducing an optical disk having information recorded along the depth direction of the pits, using a tangential push-pull signal.

FIG. 18 shows the basic principle of reproducing information recorded by the pits depth, using the proposed technique. When we represent the wavelength of the light beam by $\lambda$ and the refractive index of an optical disk substrate by n, a pit 31 represents a relatively shallow pit of which depth is smaller than $(\lambda/4n)$, for example, about $(\lambda/6n)$, and a hatched pit 32 represents a relatively deep pit having the depth larger than $(\lambda/4n)$ and smaller than $(\lambda/2n)$, for example, about $(\lambda/3n)$.

When a string of pits (track) including these pits of different depths existing mixedly is scanned by an optical beam along the beam scanning direction represented by the arrow in the figure, a signal (a) representing a total sum of the quantity of reflected light from the pit string to the photodetector does not differ significantly no matter whether the optical beam is positioned on the relatively shallow pit 31 or the relatively deep pit 32. Namely, the information represented by the total sum signal of the quantity of reflected light beam does not match differ dependent on the pit depth.

In the conventional pit (mark) length recording, stable reproduction of information is possible when presence/absence of a pit represents a distinctive change in the quantity of light. Therefore, it is desirable that there is no difference in the quantity of reflected light dependent on the pit depth, that is, it is desirable not to provide any information with the pit depth.

Now, let us consider the tangential push-pull signal (b), which is the signal obtained by dividing the reflected light beam into former and latter halves along the direction of progress of the optical beam and calculating difference in the quantity of light. When a light beam comes to or goes out from a pit, polarity of a pulse-shape signal generated at that time is inverted between a shallow pit and a deep pit, because of the difference in the diffraction pattern of the light resulting from the pit depth. This is a phenomenon completely independent from the change in the total sum signal (a) of the quantity of reflected light resulting from presence/absence of the pit.

Therefore, by detecting the polarity of the tangential push-pull signal (b) from the optical disk having pits of different depths existing mixedly, it becomes possible to represent new information by the pit depth, in addition to the presence/absence and the length of the pit in the prior art.

That the polarity of the tangential push-pull signal (b) is inverted dependent on the pit depth, however, means that the diffraction pattern of the reflected light changes dependent on the pit depth, as described above. Therefore, in the DPD method and the push pull-method in which the tracking servo signal is formed by detecting intensity distribution in accordance with the diffraction pattern of the reflected light as in the prior art example shown in FIGS. 16 and 17, it is possible that the polarity of the tracking servo signal is undesirably inverted between a deep pit and a shallow pit. Therefore, when information is to be represented by the pit depth, accurate tracking servo control becomes impossible in accordance with the conventional methods.

Figure 1:
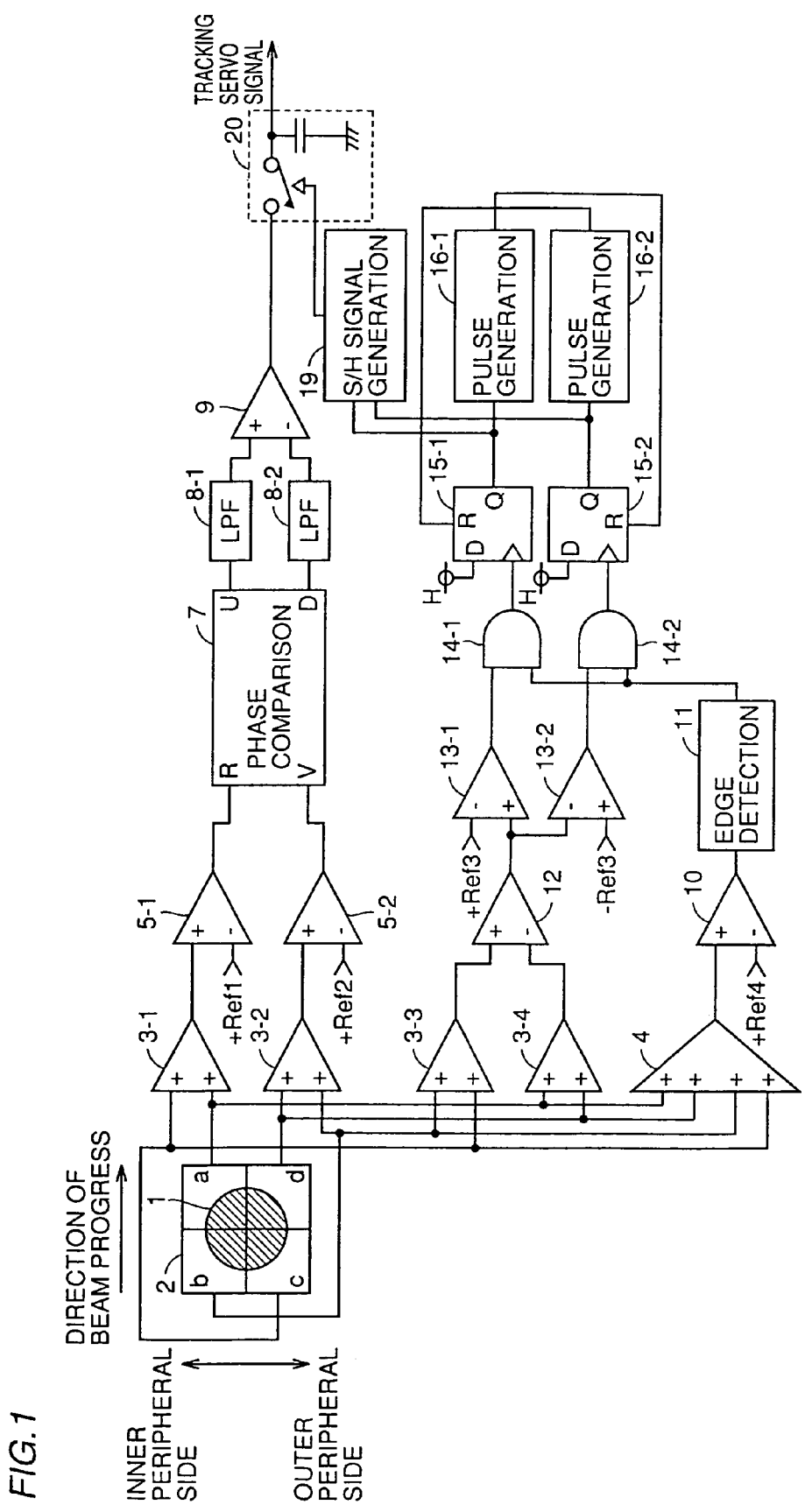
FIG. 1 is a block diagram representing a circuit configuration of a main portion of the optical disk reproducing apparatus in accordance with the first embodiment of the present invention.
Figure 2:
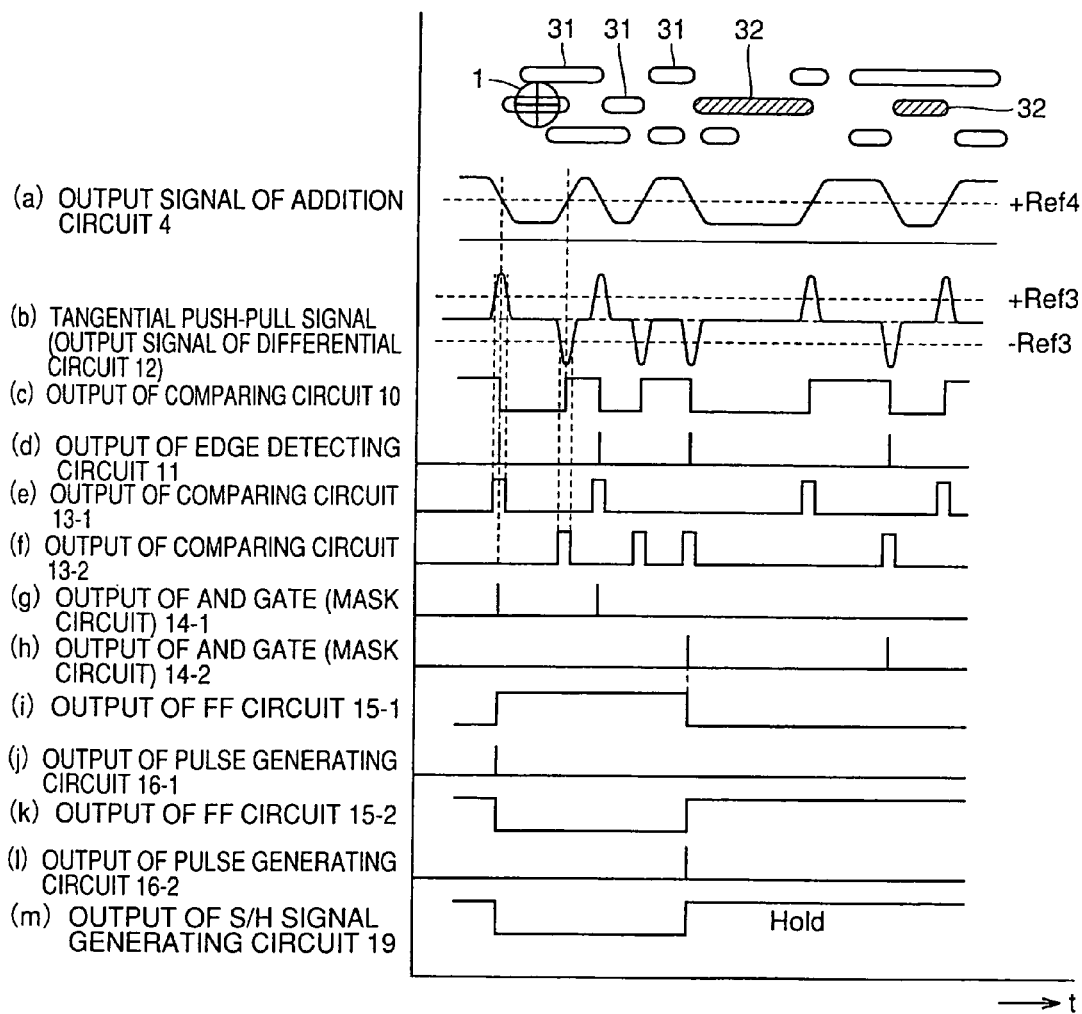
FIG. 2 is a timing chart representing an operation of the optical disk reproducing apparatus in accordance with the first embodiment shown in FIG. 1.

Referring to FIGS. 1 and 2, the operation of a main portion of the optical disk reproducing apparatus in accordance with the first embodiment of the present invention will be described. The optical disk reproducing apparatus shown in FIG. 1 is an application of the present invention to an optical disk device using the DPD method for generating the tracking servo signal (corresponding to the conventional optical disk reproducing apparatus shown in FIG. 16).

Figure 16:
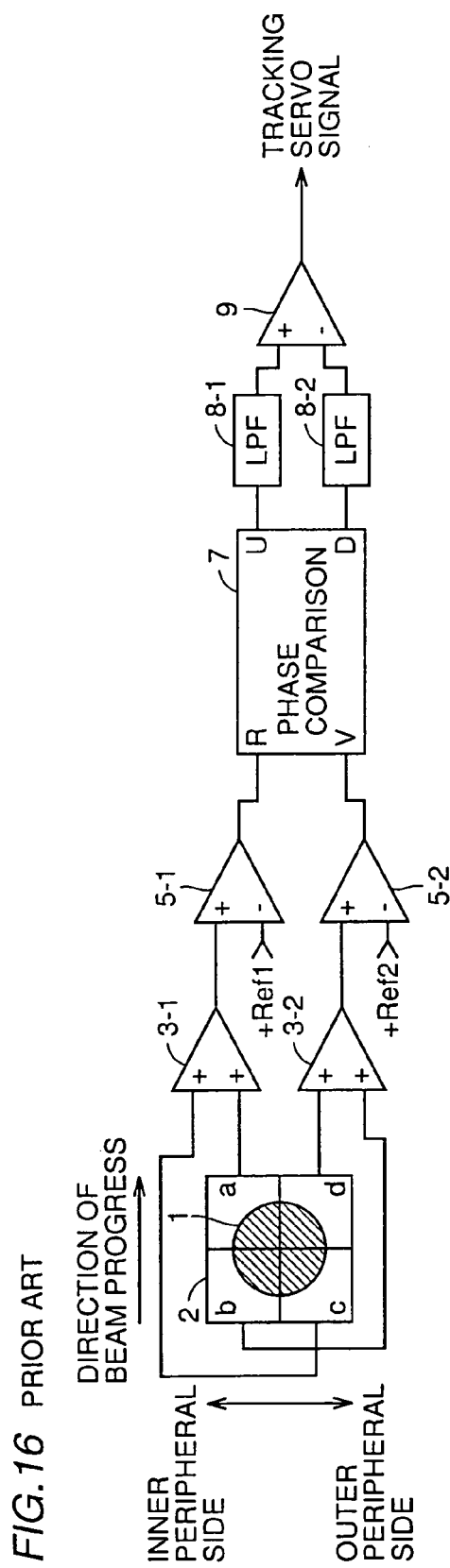
FIG. 16 is a block diagram representing a circuit configuration of a main portion of a conventional optical disk reproducing apparatus.

Referring to FIG. 1, the light reflected from the optical disk is condensed and received by photodetector 2 having the same structure as photodetector 2 shown in FIG. 16, and each of the four areas a, b, c and d provide signals corresponding to the quantity of the incident light. Addition amplifiers 3-1 and 3-2 calculate and output a sum signal of areas a and c and a sum signal of areas b and d, which are the areas positioned at opposing corners of the photodetector 2.

The circuit configurations of comparators 5-1, 5-2, phase comparing circuit 7, LPFs 8-1, 8-2 and differential circuit 9 in the succeeding stage are the same as the circuit configurations of the prior art example described with reference to FIG. 16. Therefore, description of the configurations and the operations will not be repeated.

Addition circuit 4 calculates a total sum of respective outputs from four areas a, b, c and d of photodetector 2. The output of addition circuit 4 is compared with a reference voltage +Ref4 by comparator 10, and comparator 10 generates a binary signal as a result of comparison, that is, a binary signal representing magnitude of the quantity of reflected light resulting from the presence/absence of the pit, and applies the generated signal to edge detection circuit 11. Edge detection circuit 11 is adapted such that of the rising and falling edges of the binary output signal from comparator 10, it outputs a pulse at the falling edge that corresponds to a transition of the optical beam from a non-pit area to a pit area.

Further, sum outputs (b+c) and (a+d) of the areas a, b, c and d constituting photodetector 2, that is, sum outputs of the pairs of areas at former and latter positions along the direction of progress of the optical beam, are output from addition circuits 3-3 and 3-4. The outputs of the addition circuits are input to a differential circuit 12. The output of differential circuit 12 is a tangential push-pull signal indicative of the difference in the quantity of light (difference in intensity distribution) along the tangential direction of the pit string, of the reflected light beam. The signal is commonly input to one input of each of comparators 13-1 and 13-2.

Comparator 13-1 compares the tangential push-pull signal applied to one input with the reference voltage +Ref 3 set in advance and applied to the other input, and outputs "H" when the tangential push-pull signal is larger than the reference voltage +Ref 3. Comparator 13-2 compares the tangential push-pull signal applied to one input with the reference voltage −Ref3 set in advance and applied to the other input, and outputs "H" when the tangential push-pull signal is smaller than the reference voltage −Ref3.

Outputs of comparators 13-1 and 13-2 are applied to one input terminals of AND gates 14-1 and 14-2 functioning as mask circuits, respectively, and an output of edge detecting circuit 11 is commonly applied to the other input terminals of the AND gates 14-1 and 14-2.

Therefore, AND gates 14-1 and 14-2 output a pulse, respectively, responsive to either of the comparators 13-1 and 13-2 providing "H" level, at the time point when the pulse is output from edge detecting circuit 11.

In other words, AND gates 14-1 and 14-2 provide signals obtained by binarizing the tangential push-pull signals, that is, the outputs of comparators 13-1 and 13-2, with reference to the point of change of the signal obtained by binarizing the signal indicative of the quantity of reflected light, that is, the output of the edge detecting circuit 11.

Namely, AND gates 14-1 and 14-2 have such a function as to mask and prevent feeding of any outputs of comparators 13-1 and 13-2 except at a prescribed timing when the edge detecting circuit 11 generates a pulse.

Outputs from AND gates 14-1 and 14-2 are connected to clock inputs of flip-flop circuits 15-1 and 15-2, respectively. As D inputs of flip-flop circuits 15-1 and 15-2 are connected to the "H" level, flip-flop circuits 15-1 and 15-2 have their outputs attain to the "H" level when a pulse is input to respective clock inputs, and the outputs attain to the "L" level when a pulse is input to respective reset terminals.

To the reset terminal of flip-flop circuit 15-1, an output of a pulse generating circuit 16-2, which generates a pulse at a rise of an output Q of flip-flop circuit 15-2, is applied. To the reset terminal of flip-flop circuit 15-2, an output of a pulse generating circuit 16-1, which generates a pulse at a rise of an output Q of flip-flop circuit 15-1, is applied. Therefore, when the output Q of flip-flop circuit 15-1 or 15-2 rises, that is, when a pulse output is applied from AND gate 14-1 or 14-2 to the corresponding one of the flip-flop circuits 15-1 and 15-2, the other flip-flop circuit is reset.

To an S/H signal generating circuit 19, output signals from flip-flop circuits 15-1 and 15-2 are input. The S/H signal generating circuit 19 selects and outputs either of the two input signals, in response to a signal instructing which of the information from the shallow pit and the information from the deep pit is to be reproduced at that time, applied from a control unit, not shown.

The S/H circuit 20 samples (or through) or holds an output signal from differential circuit 9, based on an output of S/H signal generating circuit 19. More specifically, even when there are pits of two different depths exist mixedly, the tracking servo signal output from differential circuit 9 is output and used for the tracking servo, only when the optical beam is on the pit of that depth which is designated to be reproduced at that time, by the S/H signal generating circuit 19 and the S/H circuit 20. When the optical beam is on the pit having different depth, the immediately preceding tracking servo signal is held by the S/H circuit 20, and provided as the tracking servo signal for tracking servo. Therefore, stable tracking servo control becomes possible constantly, regardless of the pit depth.

Operational waveforms of various portions of the optical disk reproducing apparatus in accordance with the embodiment shown in FIG. 1, when the optical beam follows the pit string (track) of an optical disk having pits of different depths existing mixedly, will be described with reference to FIG. 2.

Referring to FIG. 2, there are relatively shallow pits 31 and hatched, relatively deep pits 32, existing mixedly on an optical disk. When an optical beam 1 follows the pit string, the output signal (a) of addition circuit 4 representing the total quantity of the reflected light beam has its level changed dependent on the presence/absence of the pit. More specifically, as the optical beam comes to a pit, the level of the quantity of reflective light lowers, and as the beam goes out from the pit, the quantity of reflected light increases.

The tangential push-pull signal (b), which is the output of differential circuit 12, represents the difference in intensity distribution of the reflected light beam along the tangential direction of the pit string, as already described. Therefore, when the former half and the latter half along the direction of progress of the optical beam are in different situations, more specifically, when the optical beam is positioned near the front or rear edge of the pit as the beam comes to or goes out from the pit, the tangential push-pull signal (b) would be pulse-shaped signals of opposite polarities.

Now, the intensity distribution of the light reflected from the pit results from the influence of diffraction by the pit on the optical beam. Particularly, when we represent the wavelength of the used optical beam by $\lambda$ and the index of refraction of the optical disk substrate by n, the direction of diffraction is inverted, with the depth of ($\lambda/4n$) being the border.

When shallow pits having the depth smaller than the boundary value of ($\lambda/4n$) and pits deeper than that are formed, it follows that the pulse polarity pattern of the tangential push-pull signal when the optical beam comes to a pit and goes out from the pit will be inverted, between the shallow pit and the deep pit.

Therefore, by monitoring the polarity of tangential push-pull signal (b) at the time point when the level of the output signal (a) of addition circuit 4 representing the total quantity of the reflected light beam changes, that is, at the time point when the optical beam comes to a pit and the time point when the beam goes out from the pit is monitored, it is possible to detect the pit depth. By extracting a tracking servo signal corresponding to the pit of the designated depth to be reproduced, based on the result of detection, it becomes possible to perform correct tracking servo control corresponding to the pit depth, even when the polarity of the tangential push-pull signal is inverted because of the difference in depth pit by pit. This is the basic idea of the present invention.

Returning to FIG. 2, description of the operation of the optical disk reproducing apparatus in accordance with the present invention will be continued. The output signal (a) of addition circuit 4 representing the total quantity of reflected light is compared with the reference voltage +Ref4 by the comparator 10, whereby a binarized output signal (c) is obtained. The binary signal (c) changes between the "H" level and the "L" level, dependent on the presence/absence of the pit, regardless of the pit depth. Such a level change occurs near the edge of each pit. In the first embodiment, it is assumed that the edge detecting circuit 11 outputs the pulse signal (d) only at the fall of the binary signal (c), that is, only at the time point when the optical beam comes to a pit.

The tangential push-pull signal (b) is compared, by comparators 13-1 and 13-2, with different reference values of +Ref3 and −Ref3, respectively, and binary signals (e) and (f) are provided as a result. Logical product between the binary signals and the output (d) of edge detecting circuit 11 are the outputs (g) and (h) of AND gates 14-1 and 14-2. At a shallow pit (pit 31 of the figure), the output (e) of comparator 13-1 attains to the "H" level at the time point when the output pulse (d) of edge detecting circuit 11 is generated, and therefore a pulse is generated at the output (g) of AND gate 14-1, so that the output Q of flip-flop circuit 15-1 is set to the "H" level. By contrast, at a deep pit, the output of comparator 13-2 attains to the "H" level at a time point when the output pulse (d) of edge detecting circuit 11 is generated, so that a pulse is generated at the output (h) of AND gate 14-2, and the output Q of flip-flop circuit 15-2 is set to the "H" level.

As a result, a signal (i) is provided from flip-flop circuit 15-1, which signal attains to the "H" level in response to the output (g) of AND gate 14-1 and attains to the "L" level in response to the output (l) of pulse generating circuit 16-2, and applied to S/H signal generating circuit 19. The signal (k) is output from flip-flop circuit 15-2, which attains to the "L" level in response to the output (j) of pulse generating circuit 16-1 and attains to the "H" level in response to the output (h) of AND gate 14-2.

Then, as already described, the tracking servo signal is generated only from the DPD signal having the polarity used for tracking the pit of the depth designated to be reproduced, by the S/H signal generating circuit 19 and S/H circuit 20.

In the example of FIG. 2, the shallow pit 31 is designated as the pit of the depth to be reproduced at that time, and in response, S/H signal generating circuit 19 selects the output signal (k) of the flip-flop circuit 15-2 and applies to S/H circuit 20. As a result, while the output (m) of S/H signal generating circuit 19 is at the "L" level, the tracking servo signal provided from differential circuit 9 is directly output and used for tracking servo control. When the pit of different depth is reproduced, the output (m) of the S/H signal generating circuit 19 attains to the "H" level, an immediately preceding tracking servo signal is held by a capacitor of S/H circuit 20 and the value of the held signal is provided as the tracking servo signal for tracking servo control.

Thus, according to the first embodiment, it is possible to detect the depth of the pit from the tangential push-pull signal or the like, a deeper pit may be adapted to have different meaning from the shallow pit, for example, to increase recording density utilizing the difference in pit depth. Further, it may be possible to allot additional information to the deeper pit. The output control of the tracking servo signal in accordance with the present invention is effective to such optical disks of different types. Even for an optical disk having pits of different depths existing mixedly, correct tracking servo control is possible, and the additional information as mentioned above can be correctly reproduced.

In the timing chart of FIG. 2, the tangential push-pull signal (b) is described as being a positive pulse-shaped signal when the optical beam comes to a shallow pit 31 and a negative pulse-shaped signal when the beam goes out from the pit, and the tangential push-pull signal (b) changing in the reverse manner at a deep pit 32. The relation may be reversed and the embodiment can easily be implemented with some modification of circuit connection, for example.

Further, similar operation can be attained by eliminating AND gates 14-1 and 14-2 from the configuration of FIG. 1, applying the output of edge detecting circuit 11 directly to the clock inputs of flip-flop circuits 15-1 and 15-2, connecting the D input of flip-flop circuit 15-1 to the output of comparator 13-1 without fixing at the "H" level and by connecting the D input of flip-flop circuit 15-2 to the output of comparator 13-2 without fixing at the "H" level.

Alternatively, the operation of edge detecting circuit 11 may be different from the first embodiment described above in which the circuit outputs a pulse at a fall of the output of comparator 10. Namely, the circuit may output a pulse at a rise, or the circuit may generate pulses both at the rise and fall. In that case also, correct selection of the polarity of the tracking servo signal in accordance with the pit depth is possible by slight modification of the circuit configuration.

In the optical disk reproducing apparatus in accordance with the first embodiment, various outputs from the photodetector are all binarized by the corresponding comparators, and most of the processes of the succeeding stages are performed by the binarized signals. The components in the succeeding stages of comparators 13-1 and 13-2 binarizing the tangential push-pull signal and the comparator 10 binarizing the total sum signal of the light quantity up to the control of S/H circuit 20 can be implemented by a digital IC, facilitating integration.

In the optical disk reproducing apparatus in accordance with the first embodiment, the tracking servo signal is generated by the DPD method. The DPD method is advantageous in that when the light beam follows a pit string on an optical disk with large eccentricity, the tracking servo signal is not much susceptible to offset even when the objective lens condensing the light beam is much displaced. Further, phase difference detection after the signals from the photodetector are binarized by comparators 5-1 and 5-2 can be done by a digital circuit, which is further advantageous in view of integration of the circuitry.

As to photodetector 2 of FIG. 1, in the first embodiment, the detector is divided such that, of the reflected light beam, intensity distributions approximately parallel to the radial direction of the optical disk and the tangential direction of the pit string are detected. Therefore, it is possible to obtain the tangential push-pull signal, push-pull signal and a signal corresponding to the total sum of the quantity of reflected light from the outputs of respective areas of the photodetector, based on the intensity distributions of the reflected light.

More specifically, the photodetector consists of four areas, formed divided into two along the radial direction of the disk and divided into two along the tangential direction (divided into four in a cross-shape). The photodetector of this configuration has been widely used in the optical pickup for the conventional optical disk devices. The photodetector of this type allows generation of a focus error signal in accordance with astigmatism, and automatic control of the polarity of the tracking servo signal in accordance with the detected pit depth in accordance with the present invention is also possible, without the necessity of adding any new element to the conventional optical pickup.

Further, when the pit has one kind of depth as in the conventional optical disk, the change in polarity of the tangential push-pull signal (b) along with the change in the level of the output signal (a) from addition circuit 4, which is the total sum signal of the quantity of reflected light, is constant. Therefore, the polarity of the tracking servo signal is fixed to the one appropriate for the pit depth. Namely, the optical disk reproducing apparatus in accordance with the first embodiment maintains compatibility with the conventional optical disk.

In an optical disk of such a type that records information by forming recording marks of different reflectances to optical irradiation, rather than the recessed and protruded shapes such as pits, not only the total sum signal of the quantity of reflected light but also the tangential push-pull signal can be obtained. This is because there is generated a difference in the intensity distribution along the forward and rearward directions of the progress of the light beam, when the light beam comes to and goes out from the recording mark. The polarity of the tangential push-pull signal results from the difference in reflectance between the recording mark portion and the non-recording mark portion, and not from the depth of the pit. Therefore, in the optical disk of the type recording information by the recording marks, polarity of the tracking servo signal is fixed, and reproduction of information provided by the recording marks can be done correctly, by the optical disk reproducing apparatus in accordance with the first embodiment of the present invention.

It should be noted, however, that if the contents of an optical disk having information recorded by the depth of the pits is copied on this type of recordable optical disk utilizing the recording marks, only the information represented by the change in the total sum of the reflected light beam quantity can be copied, and the information in accordance with the depth of the pits cannot be copied. This means that the copy of the information recorded by the pit depth can be prevented.

Utilizing the fact that the polarity of the tracking servo signal is fixed on the optical disk of the type recording information by the recording marks of different reflectances, the pit depth may be adjusted in the optical disk of the type recording information by the pits such that the polarity of the tracking servo signal is fixed to the opposite polarity. In such a case, correct tracking servo control is possible by using the optical disk reproducing apparatus in accordance with the first embodiment for an optical disk on which information is recorded by pits, while the polarity of the tracking servo signal is reversed when the contents of this optical disk is copied on the optical disk of the recording mark type, and hence the track cannot be followed but deviated and the information cannot be reproduced. Therefore, such an approach may be effective as a new method of preventing unauthorized copying.

Figure 3:
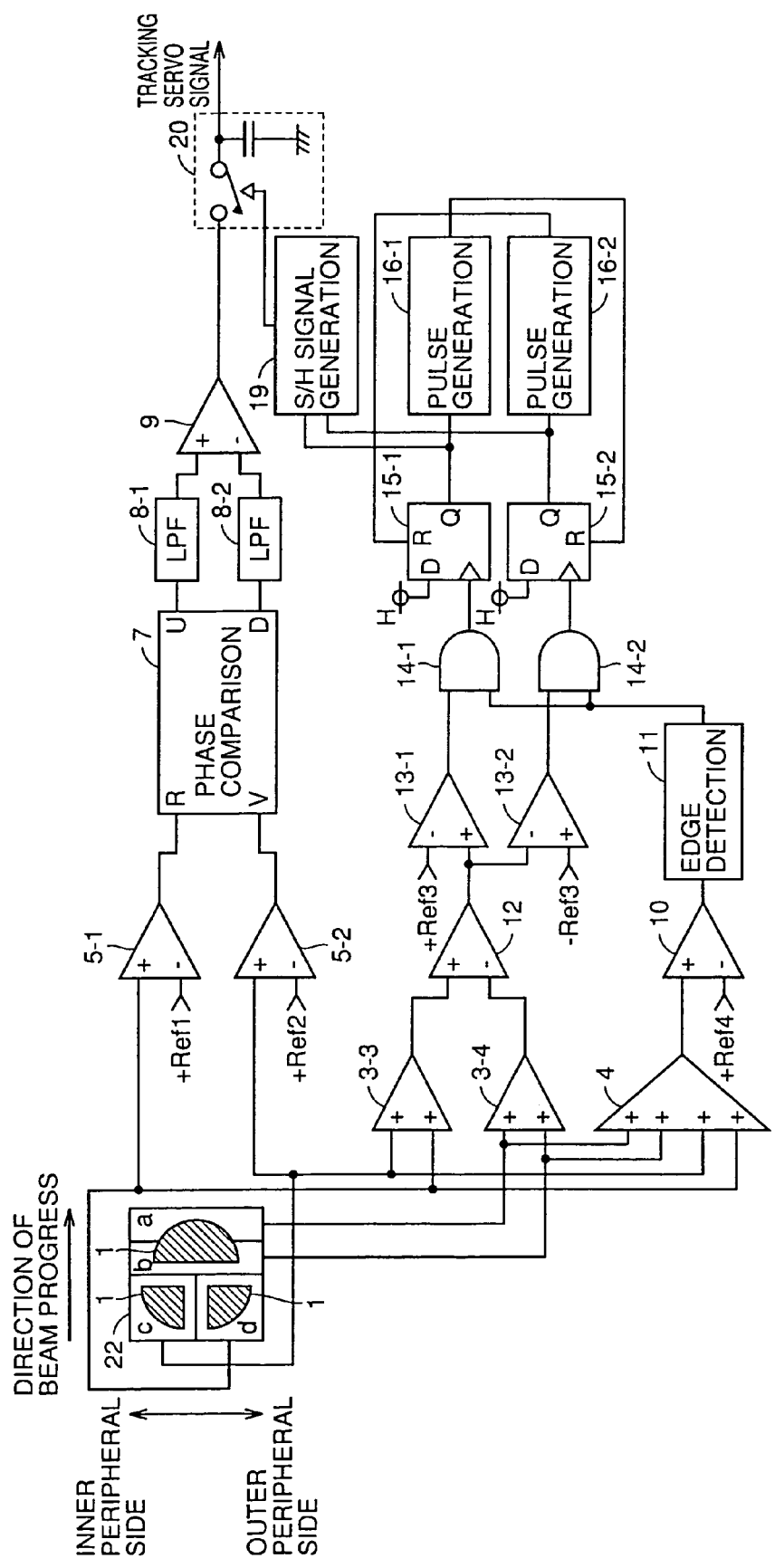
FIG. 3 is a block diagram representing a circuit configuration of a main portion of the optical disk reproducing apparatus in accordance with the second embodiment of the present invention.

Referring to FIG. 3, the main portion of the optical disk reproducing apparatus in accordance with the second embodiment of the present invention will be described. In the second embodiment, a photodetector 22 having a structure different from the photodetector 2 of the first embodiment shown in FIG. 1 is used as the photodetector for receiving the reflected light beam. Except for this point, the circuit configuration is similar to that of the first embodiment shown in FIG. 1. Therefore, description of the common portions will not be repeated.

Generally, the photodetector of the type divided into two along the radial direction of the disk and divided into two along the tangential direction (divided into four in the cross-shape) is often used in an optical pickup fabricated by assembling separate optical components. Though not described in the first embodiment, a focus servo signal is often generated from the photodetector 2 of the type of the first embodiment, and in that case, an optical technique referred to as astigmatism is additionally utilized.

In order to perform astigmatism, however, adjustment of the optical system is rather sensitive, and the number of separate optical components is considerably large. Therefore, the cost of assembly and adjustment tends to be higher.

Recently, a unit containing a photodetector, a semiconductor laser as a light source and the like integrated in a package to reduce the number of separate components and to facilitate adjustment of the optical system comes to be widely used. This is the so-called hologram laser unit, in which part of the optical system is replaced by a kind of diffraction grating referred to as a hologram, and the focus servo signal, the tracking servo signal and recorded information signal can be generated from an output of the photodetector contained in the unit.

As the photodetector 2 of the first embodiment shown in FIG. 1, photodetector 22 in the optical disk reproducing apparatus of the second embodiment shown in FIG. 3 is divided into four areas a, b, c and d. The reflected light beam 1, however, is divided by the hologram (not shown) as the diffraction grating mentioned above into a plurality of pieces, and condensed on respective areas. Areas a and b receive those portions of the reflected light which correspond to the former half along the scanning and proceeding direction of the light beam. As the hologram is so designed that the quantity of light incident on the areas a and b change in accordance with the deviation of the point of focus of the optical beam with respect to the optical disk, it is possible to obtain the focus servo signal from the difference between the outputs of areas a and b.

The areas c and d receive the portions of the light corresponding to the latter half along the scanning and proceeding direction of the optical disk. As the areas c and d are so arranged as to receive the light from the inner peripheral side and the outer peripheral side of the optical disk, it is possible to obtain the tracking signal by the DPD method or the push-pull method from the outputs of areas c and d, as will be described later. The total sum of the outputs of areas a, b, c and d reflects the change in the quantity of reflected light, that is, the information signal recorded by the pits on the optical disk.

In order to obtain the tangential push-pull signal, what is necessary is to calculate the difference in the quantity of light along the direction of progress and scanning of the optical beam, that is, along the tangential direction of the pit string, of the reflected light, as in the first embodiment. Therefore, in the second embodiment shown in FIG. 3, the outputs from areas a and b receiving the reflected light corresponding to the former half are added by addition circuit 3-4, and the outputs from areas c and d receiving the reflected light corresponding to the latter half are added by addition circuit 3-3 and the difference between the results of addition is calculated by differential circuit 12. Further, addition circuit 4 calculating the total sum signal of the quantity of reflected light is so connected as to calculate the sum of all the outputs from four areas a, b, c and d.

The addition circuits 3-1 and 3-2 used in the first embodiment shown in FIG. 1 for generating the tracking servo signal in accordance with the DPD method are not provided in the second embodiment shown in FIG. 3. The reason for this is as follows. The arrangement of the areas of photodetector 22 is different from the arrangement of the areas of photodetector 2 of FIG. 1 described above, and therefore the signals to be used for DPD method cannot be obtained from areas a and b. More specifically, areas a and b are arranged at positions not allowing detection of the intensity distribution along the radial direction of the optical disk, while areas c and d are arranged to enable such detection of the intensity distribution. Difference from the photodetector 2 of the first embodiment comes from the fact that the arrangement of areas is selected such that photodetector 22 is implemented as a smaller component that can be incorporated in the hologram laser unit.

The outputs from two areas c and d receiving light beams reflected from the inner peripheral side and the outer peripheral side respectively, along the radial direction of the optical disk, include phase difference corresponding to the relative positional deviation between the optical beam and the pit string. Therefore, it is possible to generate the tracking servo signal in accordance with the DPD method from these outputs. Therefore, in the second embodiment shown in FIG. 3, the outputs of areas c and d are not added to the outputs of other areas but directly applied to comparators 5-1 and 5-2.

The operation and the configuration of the circuit in accordance with the second embodiment shown in FIG. 3 are the same as those of the first embodiment described with reference to FIG. 1 except for the difference of the photodetector. Therefore, detailed description is not repeated.

Photodetector 22 shown in FIG. 3 will be further described. It is understood that in the second embodiment also, the areas are arranged so as to enable detection of intensity distributions in the directions approximately parallel to the tangential direction of the pit string and to the radial direction of the optical disk, among the reflected light. More specifically, the areas c and d detect the intensity distribution in the direction approximately parallel to the radial direction of the optical disk, and the pair of areas a and b and pair of areas c and d detect intensity distribution in the direction approximately parallel to the tangential direction of the pit string. Therefore, as in the first embodiment shown in FIG. 1, it is possible to obtain all of the tangential push-pull signal, various signals necessary for generating the tracking servo signal in accordance with the DPD method and the signal corresponding to the total sum of the quantity of the reflected light, based on the outputs of respective areas of photodetector 22.

Further, the arrangement of the areas constituting photodetector 22 shown in FIG. 3 is suitable for incorporation into the hologram laser unit as described above. Therefore, the advantage of the present invention that the pit depth is detected and the polarity of the tracking servo signal in accordance with the pit of the depth to be reproduced can be automatically selected, can still be attained when the optical pickup reduced in size by using the hologram laser unit is used.

Figure 4:
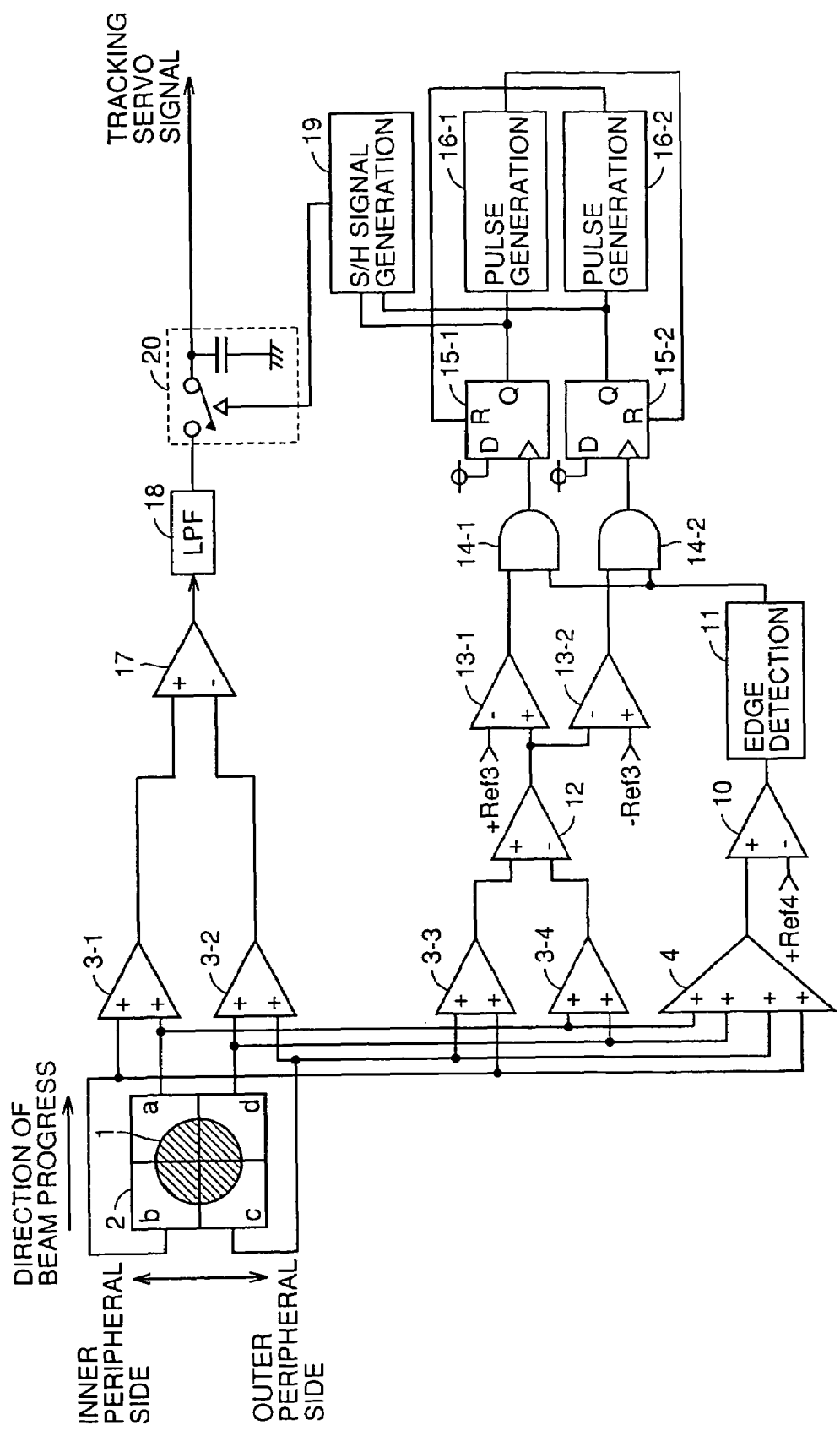
FIG. 4 is a block diagram representing a circuit configuration of a main portion of the optical disk reproducing apparatus in accordance with the third embodiment of the present invention.

Referring to FIG. 4, the optical disk reproducing apparatus in accordance with the third embodiment of the present invention will be described. As in the first embodiment shown in FIG. 1, in the third embodiment, photodetector 2 divided into four areas in the cross shape is used. In the present embodiment, however, not the DPD method but the push-pull method is used to generate the tracking servo signal.

In the third embodiment shown in FIG. 4, operations other than the operation related to generation of the tracking servo signal, that is, the operations of calculating the tangential push-pull signal and the total sum signal of the quantity of reflected light, detecting the pit depth based on these signals and selecting the tracking servo signal of the polarity corresponding to the pit having the depth to be reproduced are the same as those in the first embodiment. Therefore, description of the common portions will not be repeated.

As already described, in the third embodiment, push-pull method is adopted to generate the tracking servo signal. In the push-pull method, the reflected light beam is divided into the inner peripheral side and the outer peripheral side of the optical disk, intensity difference therebetween is calculated and the tracking servo signal is generated therefrom.

For this purpose, in the third embodiment shown in FIG. 4, the sum of outputs from areas a and b receiving the components of the reflected light of the inner peripheral side of the optical disk is calculated by addition circuit 3-1, and the sum of outputs from areas c and d receiving the components of the reflected light of the outer peripheral side of the optical disk is calculated by addition circuit 3-2. The present embodiment is adapted such that the difference between the outputs of addition circuits 31 and 3-2 is calculated by differential circuit 17, without using the phase comparing circuit (phase comparing circuit 7 of FIG. 1) used in the DPD method. The resulting difference output from differential circuit 17 has its low frequency component extracted by LPF 18 and the result is supplied as the tracking servo signal through S/H circuit 20.

In the third embodiment, push-pull method is used for generating the tracking servo signal. According to the push-pull method, it is possible to form a tracking servo signal from an optical disk containing not only pit strings but also grooves as continuous guiding grooves formed on the optical disk.

Figure 5:
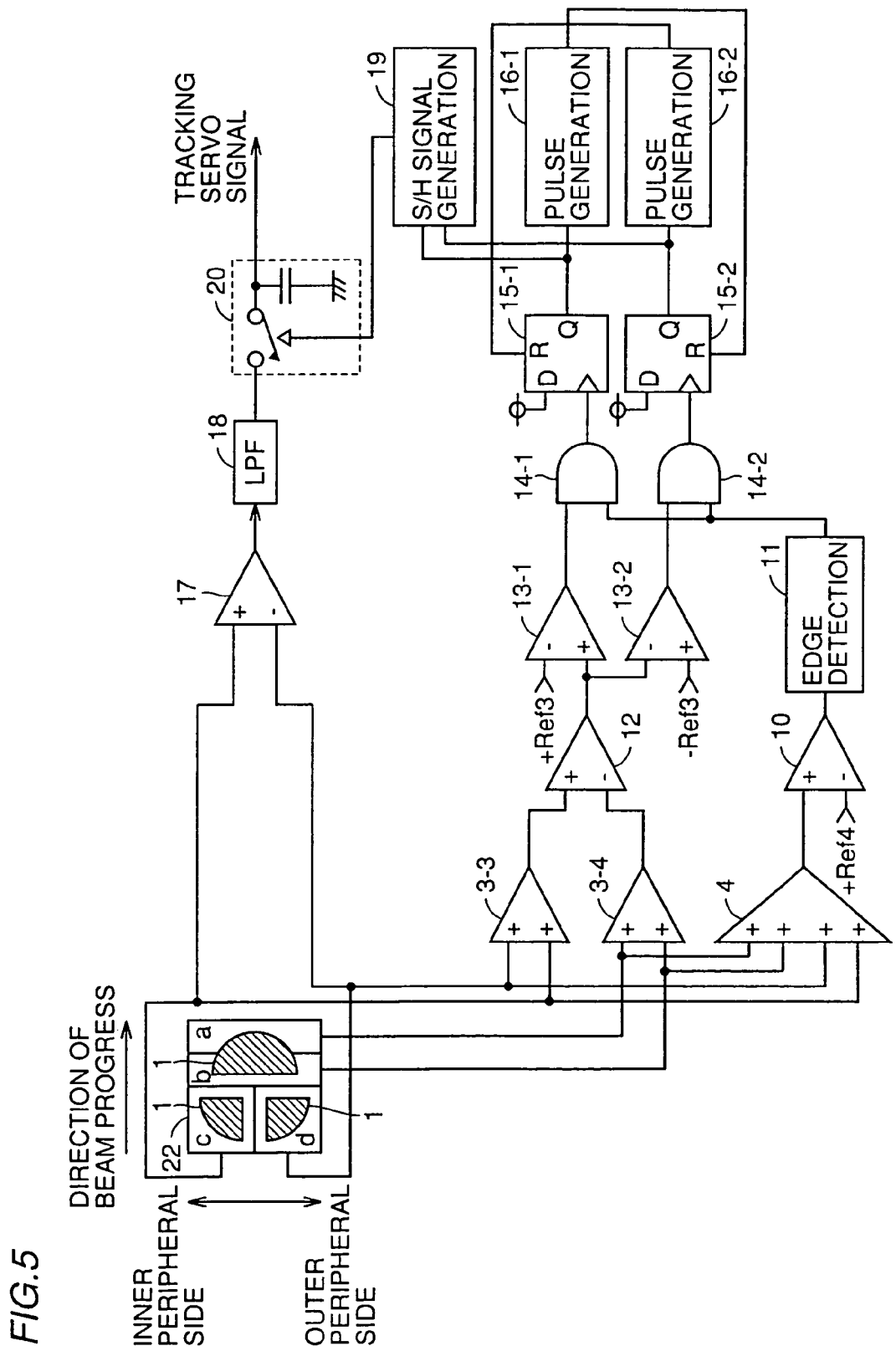
FIG. 5 is a block diagram representing a circuit configuration of a main portion of the optical disk reproducing apparatus in accordance with a fourth embodiment of the present invention.

The optical disk reproducing apparatus in accordance with the fourth embodiment of the present invention will be described with reference to FIG. 5. In the fourth embodiment, as in the second embodiment shown in FIG. 3, a photodetector 22 not having the cross-shape, incorporated in the hologram laser unit is used, and as in the fourth embodiment, push-pull method is applied to generate the tracking servo signal.

In the fourth embodiment shown in FIG. 5, configurations and operations of portions for obtaining the pit depth by calculating the tangential push-pull signal and the signal corresponding to the quantity of reflected light, such as photodetector 22, addition circuits 3-3, 3-4, 4 and various circuits of the succeeding stages are the same as those of the second embodiment described with reference to FIG. 3. Therefore, description thereof will not be repeated.

What is different from the second embodiment shown in FIG. 3 is the connection of areas c and d of photodetector 22. Namely, outputs of these areas c and d are applied to differential circuit 17, so that the difference therebetween is calculated.

As already described with reference to the third embodiment, in the push-pull method, the reflected light of the beam is divided into the inner peripheral side and the outer peripheral side of the optical disk, and intensity difference therebetween is detected and used to generate the tracking servo signal. As already described with reference to the second embodiment, areas c and d are arranged to receive the portion corresponding to the latter half of the reflected light, and in addition, the areas are arranged to receive the light beams from the inner peripheral side and the outer peripheral side of the optical disk. Therefore, by calculating the difference between the outputs of areas c and d, it is possible to obtain the tracking servo signal in accordance with the push-pull method, in the similar manner as when the photodetector 2 divided into the cross-shape is used.

As already described with reference to the first embodiment, in the present invention, the direction of diffraction of the beam reflected from the pit and hence intensity distribution of the reflected light differs dependent on the pit depth. Particularly, in any of the first to fourth embodiments described above, when we represent the wavelength of the light beam used (optical beam directed to the optical disk) by $\lambda$ and the index of reflection of the optical disk substrate by n, the fact that inversion in the diffraction direction occurs at the bit depth of ($\lambda/4n$) as the boundary is utilized. This is the common principle in any of the above described embodiments.

The depth at which inversion of the direction of diffraction occurs is not limited to ($\lambda/4n$). Actually, inversion occurs when the depth increases from this reference value by ($\lambda/2n$). Therefore, generally, when the depth of the pit can be classified into ranges d1 and d2 satisfying the following relation, the direction of diffraction of the reflected light is inverted between the pits having the depth belonging to the depth range d1 and the pits having the depth belonging to the depth range d2, and therefore, it is possible to detect the depth of the pit and select the polarity of the corresponding tracking servo signal:

$$(k\lambda/2n) < D1 < \{(\lambda/4n) + (k\lambda/2n)\}$$

or $$\{(\lambda/4n) + (m\lambda/2n)\} < D2 < \{(m+1)\cdot\lambda/2n\}$$

where $\lambda$ represents the wavelength of the light beam, n represents the refractive index of the substrate of the optical disk, and k and m represent arbitrary natural numbers.

Therefore, in manufacturing the optical disk, when there is some condition such that a pit having a certain depth is easier to manufacture, then the arbitrary natural numbers k and m may be selected to satisfy such a manufacturing condition. The values k and m may not be the same. Therefore, the degree of freedom in selecting the pit depth is high.

Generally, however, manufacturing is easier if the pit depth is minimum, and it is said that the quality of the reproduced signal is better. Therefore, at least one of the natural numbers k and m may be set to 0.

When a pit is formed as a hole having a simple shape, there is the above described limit as to the depth at which the direction of diffraction is inverted. In a pit formed as a hole having a complicated cross sectional shape, there are two different depths at which the polarity of the tangential push-pull signal can be made different, outside the above described limitation. Therefore, according to the present invention, what is necessary for the two different depths of the pits mixedly existing on the optical disk is that the depths are selected such that the tangential push-pull signals obtained when the pits are reproduced differ in polarity between the pits of one depth and the pits of another depth.

As described above, according to the first to fourth embodiments of the present invention, the pit depth is detected, and the polarity of the tracking servo signal corresponding to the depth of the pit to be reproduced at that time is automatically selected. Therefore, correct and stable tracking servo control is possible even for an optical disk having pits of different depths existing mixedly. For an optical disk having one common pit depth, the tracking servo signal is generated for each pit. Therefore, the optical disk reproducing apparatus in accordance with the first to fourth embodiments maintain compatibility with the conventional optical disk.

Further, detection of the pit depth described above is performed based on the total sum signal of the quantity of the light beam reflected from the pit string and the polarity of the tangential push-pull signal corresponding to the difference in the intensity distribution of the reflected light beam along the tangential direction of the pit string. These signals can be generated easily from the optical pickup, and it is unnecessary to provide a new photodetector or sensors. Thus, the pit depth can be determined by a simple structure.

The first to fourth embodiments described above are made in order to solve the problem that because of the change in the pattern of diffraction of the reflected light beam dependent on the pit depth in the optical disk having pits of different depths, the DPD signal formed in accordance with the DPD method or the push-pull signal generated in accordance with the push-pull method, to be used for the tracking servo signal, comes to have the polarity inverted at pits of different depths, preventing correct tracking servo control.

The DPD signal can be obtained not only from the pit formed as a hole, but also from the recording mark. Therefore, the problem that the polarity of the DPD signal obtained in accordance with the conventional DPD method is inverted, preventing correct tracking servo control, is experienced not only in the optical disk having the pits of different depths existing mixedly such as described above but also in a disk having pits, recording marks and the like, the polarity of the DPD signals obtained therefrom are different.

Further, the push-pull signal can be obtained not only from the pit formed as a hole, but also from grooves/lands as continuous guiding grooves. Therefore, there is also the problem that correct tracking servo control is impossible, in an optical disk having the pits, grooves/lands and the like, the polarity of the push-pull signals obtained therefrom being different, exist mixedly.

The present invention contemplates correct and stable tracking servo control of not only the optical disk having pits of different depths existing mixedly as described above but also the optical disks having pits, marks, grooves/lands and the like existing mixedly, from which the signal components representing deviation between the optical beam and the track such as the DPD signal and the push-pull signal are detected in different polarities.

In the fifth embodiment described in the following, an optical pickup having an optical system including a laser beam having the wavelength of 650 nm and an objective lens having the numerical aperture (NA) of 0.6, and an optical disk having the track pitch of 0.74 µm, the minimal pit length and the minimum mark length of 0.4 µm and the substrate thickness of 0.6 mm, having 8/16-modulated signals recorded along the direction of its length are used, and an experiment was performed.

Signal recording and reproduction is performed with the linear velocity of 4 m/sec. It is assumed that the tracking servo system that drives the objective lens and performs tracking of the optical beam along the track has the response speed of about 5 kHz.

Figure 17:
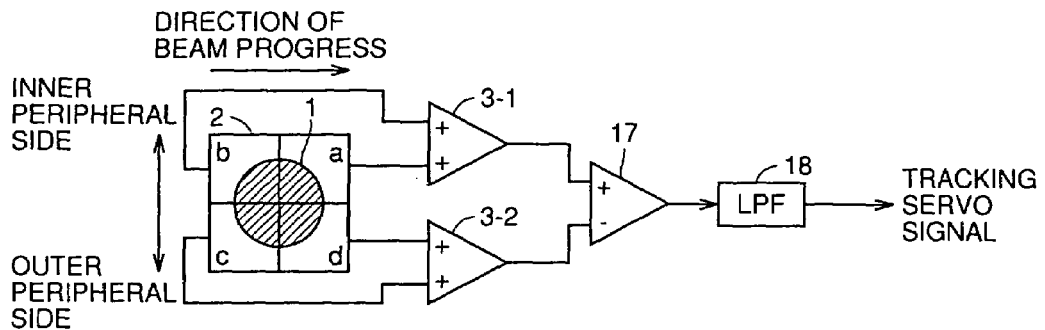
FIG. 17 is a block diagram representing a circuit configuration of a main portion of another conventional optical disk reproducing apparatus.

As described with reference to the prior art example shown in FIG. 16, the DPD signal formed in accordance with the DPD method is utilized as the tracking servo signal after it is passed through LPFs 8-1 and 8-2. The push-pull signal formed in accordance with the push-pull method described with reference to the prior art example shown in FIG. 17 is passed through LPF 18, and thereafter utilized as the tracking servo signal.

Generally, the bandwidth necessary for the tracking servo control is lower than the bandwidth of the pits, marks and the like formed on the disk. When a tracking servo signal of an unnecessarily high frequency is applied to an actuator for tracking, an actuator driver and an actuator coil are heated, degrading reliability and life of the device, possibly resulting in increased power consumption and malfunction. From these reasons, a tracking servo signal of low frequency is extracted from the DPD signal or the push-pull signal, using the lowpass filters described above.

In the optical disk and the optical disk reproducing apparatus in accordance with further embodiments of the invention as will be described in the following, the bandwidth necessary for tracking is several kHz, and the pits, marks and the like are recorded and reproduced with the maximum bandwidth of about 5 MHz. In view of the foregoing, a lowpass filter that passes signals not higher than several tens of kHz is used as the lowpass filter in the embodiments below.

Figure 6:
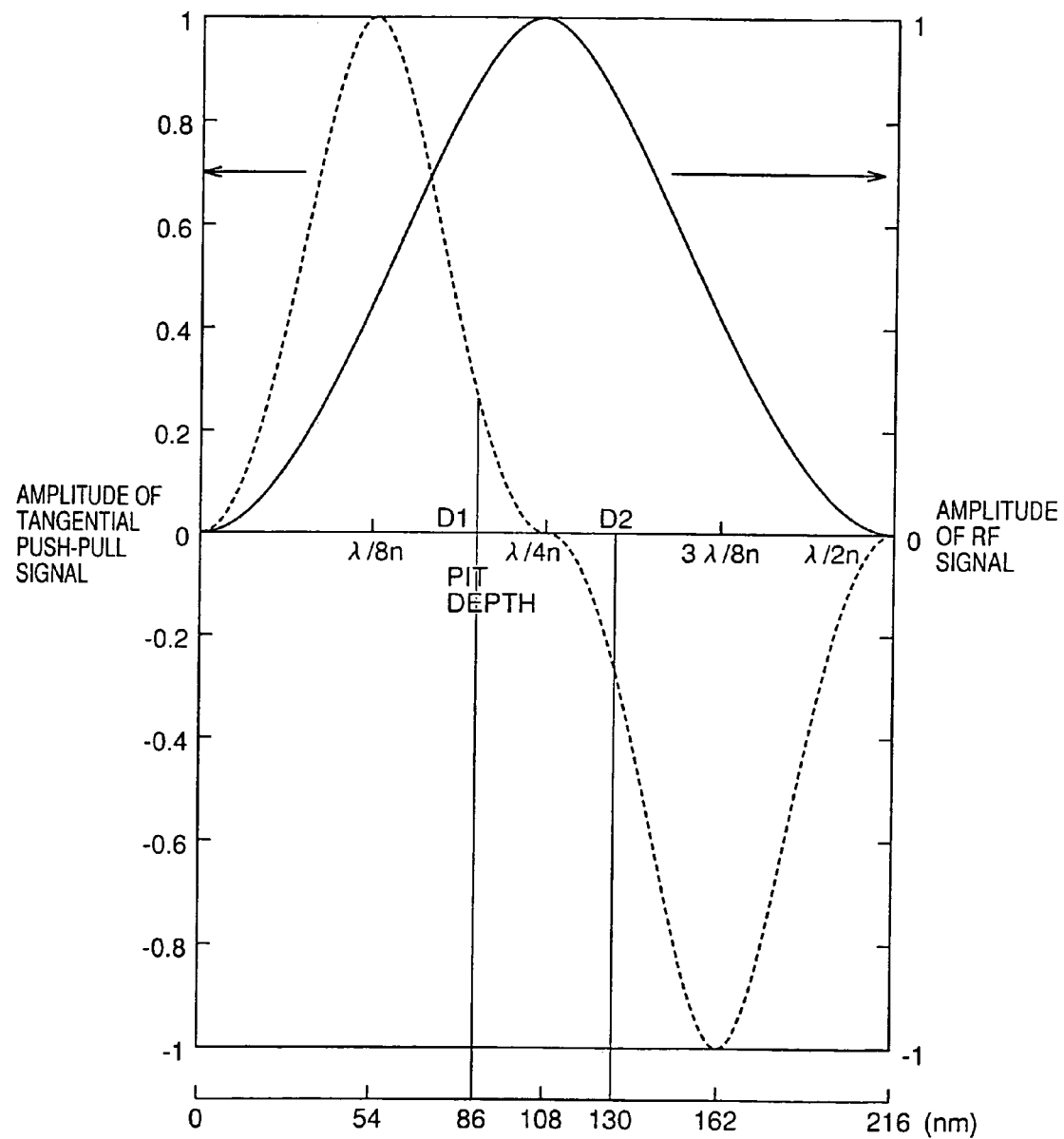
FIG. 6 is a graph representing a relation among pit depth, amplitude of a tangential push-pull signal and amplitude of an RF signal.

FIG. 6 is a graph representing the relation between the pit depths and amplitudes of the tangential push-pull signal and the RF signal (total quantity of reflected light). As in the first to fourth embodiments described above, the disk used in the fifth embodiment has information recorded in the depth direction, and pits having the depths D1 and D2 as shown in FIG. 6 exist mixedly, forming the pit string, that is, track.

Figure 7:
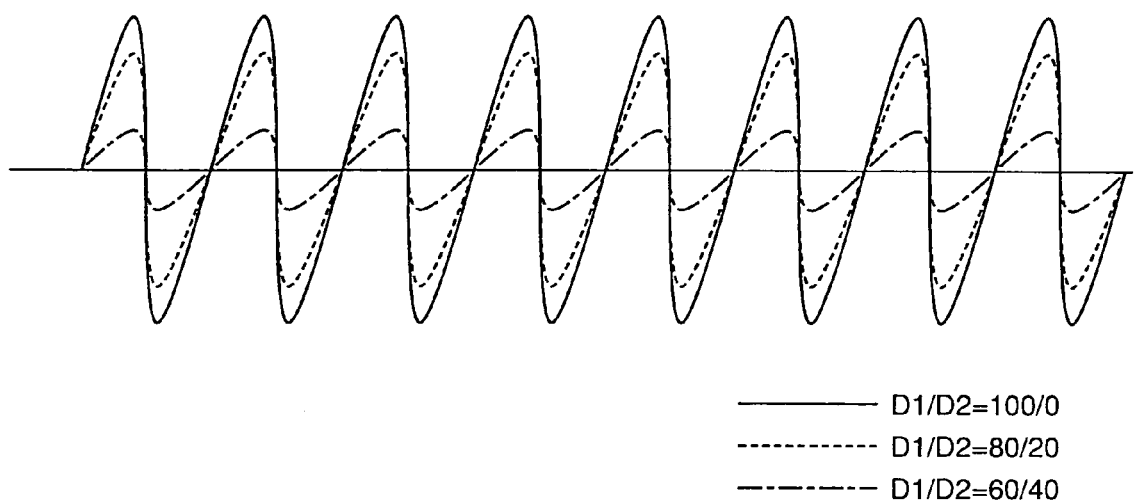
FIG. 7 is a waveform diagram representing a relation between the amplitude of a DPD signal and the ratio of mixture of pits having different depths.

The pit having the depth D1 is shallower than $\lambda/4n$, and the pit having the depth D2 is deeper than $\lambda/4n$. FIG. 7 is a waveform diagram representing the manner of track crossing of the tracking servo signal obtained in accordance with the DPD method, monitored while variously changing the ratio of mixture of the pits of different depths, in a time period corresponding to the period of 50 kHz, that is, ten times the frequency of the response speed of 5 kHz of the tracking servo system, under the above described conditions.

The tracking servo signal shown in FIG. 7 is obtained with focus servo being turned on and the track servo being turned off, of the pickup actuator of the optical disk reproducing apparatus. As shown in FIG. 7, the optical beam crosses a plurality of tracks, by the eccentricity of the spirally formed tracks.

Referring to FIG. 7, as compared with the case where all the pits are formed to have the depth D1 (D1/D2=100/0), as the number of pits having the depth D2 gradually increases, the amplitude of the tracking servo signal decreases, and, though not shown in FIG. 7, when the ratio between the pits D1/D2 attains 50/50, generation of the tracking servo signal is stopped. When the number of pits having the depth D2 is further increased, the tracking servo signal increases in opposite polarity, though not shown in FIG. 7. When all the pits are formed to have the depth D2, a tracking servo signal opposite in polarity and approximately the same in magnitude as the tracking servo signal generated when all the pits are formed to have the depth D1 is provided.

Here, the opposite polarity means that the signal waveform of the tracking servo signal is reversed in the up/down direction in FIG. 7. The reason is that at the pits having the depths D1 and D2 from which tangential push-pull signals of different polarities are obtained, the DPD signals from which the tracking servo signal derives also have opposite polarities. The DPD signals obtained from respective pits appearing at the frequency of several MHz are opposite in polarity and same in magnitude at the pits of depths D1 and D2. The tracking signal used in the present embodiment is obtained by passing the DPD signal through a lowpass filter that passes the frequency not higher than 30 kHz. Therefore, what is monitored is the signal with the signal component of 50 kHz or higher being average (time-averaged). More specifically, the DPD signal obtained from each pit is monitored as a signal component averaged in the time period corresponding to the period of the frequency of about 50 kHz.

As can be understood from FIG. 7, it is necessary to adjust the ratio of mixture of the pits having respective depths such that the tracking servo signal, time-averaged in a period shorter than the response time of the tracking servo system, that is, the actuator, is not 0.

Figure 8:
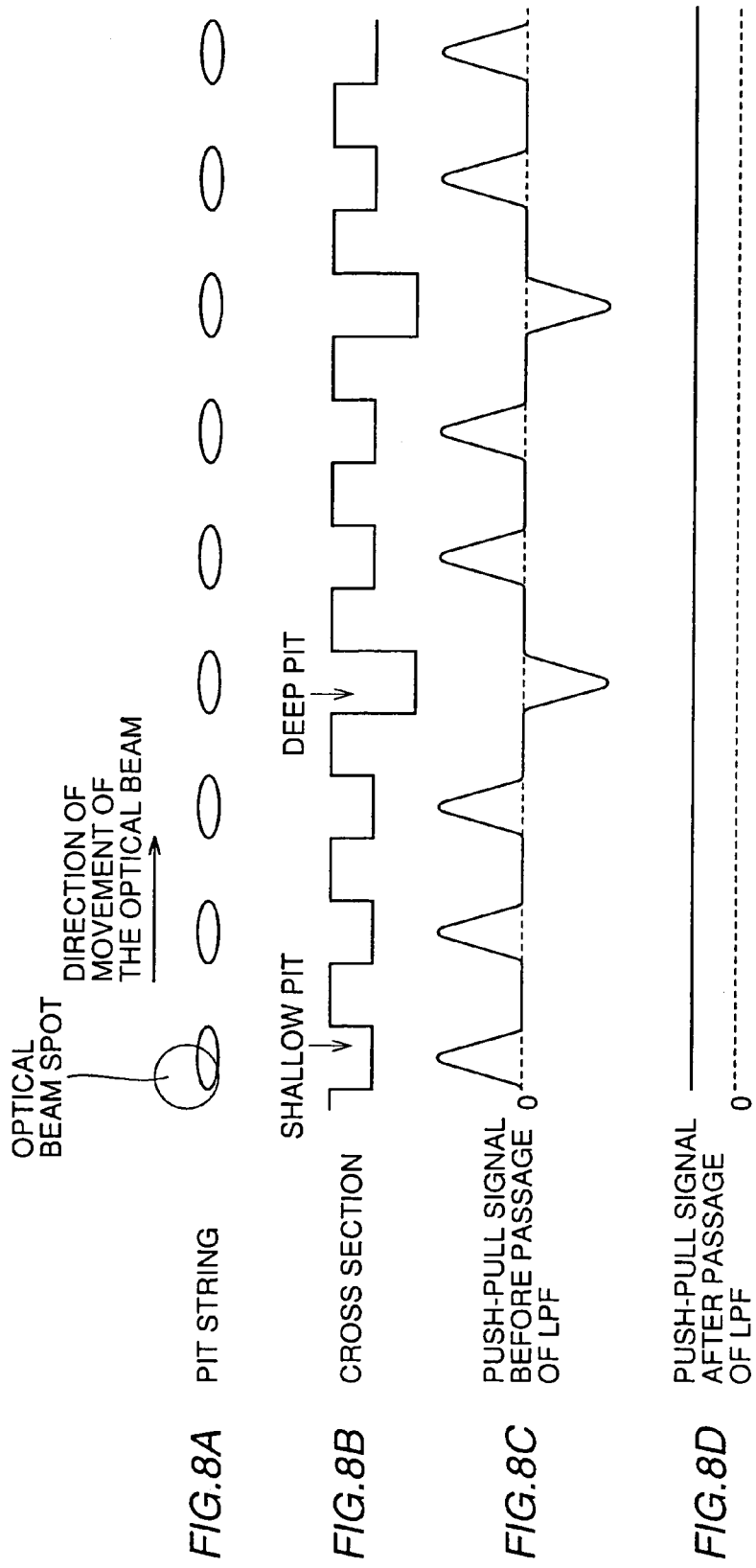
FIGS. 8A to 8D are schematic illustrations representing the relation between the structure of the optical disk and the push-pull signal derived therefrom, in accordance with the fifth embodiment of the present invention.

The structure of the optical disk in accordance with the fifth embodiment of the present invention will be described in detail with reference to FIGS. 8A to 8D. FIGS. 8A to 8D are illustrations representing the structure of the optical disk and the waveforms of the push-pull signals reproduced therefrom, in accordance with the fifth embodiment of the present invention. FIG. 8A represents a plurality of pits arranged in a line, to form a track. FIG. 8B represents a cross section of the pit string shown in FIG. 8A, where shallow pits having the depth D1 and deep pits having the depth D2 exist mixedly. The pits of these two different depths are formed to have such a ratio of mixture at which the average of the DPD signal or the push-pull signal obtained from the pits having the depth D1 becomes larger than the average of the DPD signal or the push-pull signal obtained from the pitch having the depth of D2, within a time period corresponding to one period of the frequency of about 50 kHz, that is, ten times the frequency of 5 kHz, that is the response speed of the actuator of the tracking servo system.

FIGS. 8C and 8D are waveform diagrams representing the push-pull signal before and after passing a lowpass filter, when the optical beam spot runs deviated by a certain distance from the center of the track.

As shown in FIG. 8C, before passing through the lowpass filter, the push-pull signal is obtained every time the optical beam spot passes over a pit, and the polarity thereof is opposite between the shallow pit and the deep pit, as described above. When this signal is passed through the lowpass filter, the high frequency component is cut (averaged), resulting in such a push-pull signal as shown in FIG. 8D. By applying the signal of FIG. 8D as the tracking servo signal, it becomes possible to provide thrust corresponding to the deviation of the beam spot from the center of the track to the actuator. FIGS. 8A to 8D represent generation of the tracking servo signal using a push-pull signal. However, the same applies to generation of the tracking servo signal using the DPD signal.

In this manner, according to the fifth embodiment of the present invention, the ratio of mixture of the pits having two different depths is adjusted such that the DPD signal or the push pull signal obtained when the optical beam scans the pits of different depths D1 and D2 in a prescribed time period is not 0 and either polarity is obtained. Therefore, the tracking servo signal never attains to 0 when the conventional DPD method or the push pull method is used, and therefore, in principle, tracking servo control is possible.

The foregoing will be discussed in greater detail, using a time scale and a space scale.

Figure 9:
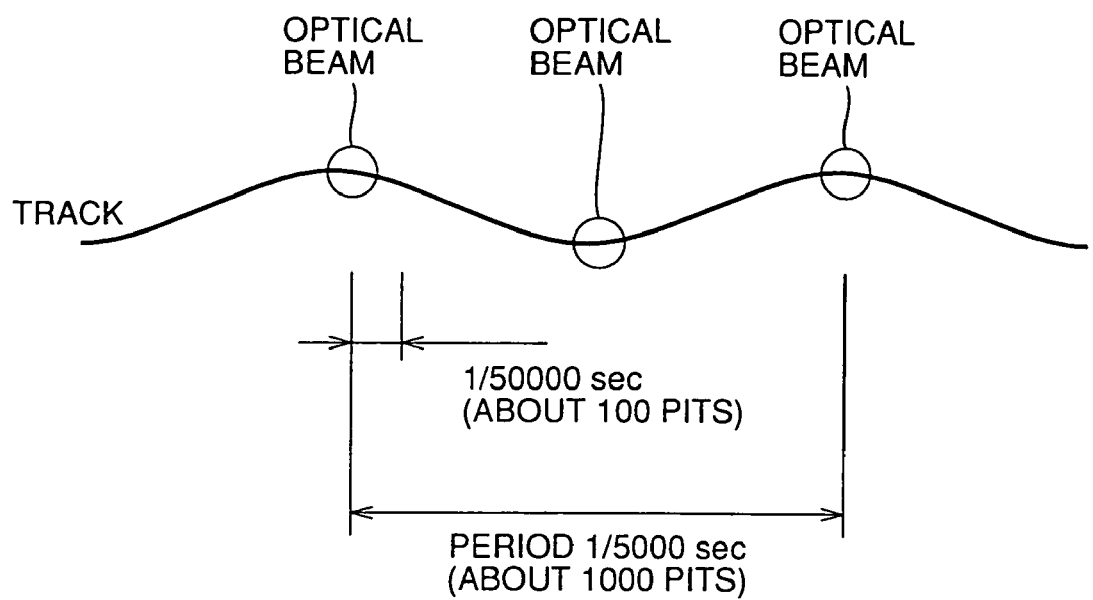
FIG. 9 is a schematic diagram representing the relation between the track and the tracking servo.

FIG. 9 schematically shows a track meandering on a disk. When the period of track meandering is about ⅕ ksec, the actuator follows the meandering track, and the optical beam can accurately scan the track.

As the pit appears at the frequency of several MHz, it follows that about 1000 pits appear in one period of the meandering of the track. When further meandering of several tens of kHz is superposed on the meandering track such as shown in FIG. 9, the actuator cannot follow the meandering of the high frequency, and therefore the actuator follows only the meandering of the bandwidth of several kHz. This is because of the mechanical response performance of the actuator.

Generally, a signal having the frequency of at most several times the response performance of the actuator is input to the actuator. The reason for this is as follows. When the frequency of the input signal is too low, the mechanical response performance of the actuator cannot be sufficiently exhibited. When a signal of unnecessarily high frequency is input, the coil included in the actuator will be damaged.

In order to input a signal of the frequency at most several times the response performance of the actuator, it is necessary to input a tracking servo signal that has passed through the lowpass filter to the actuator. As in the present embodiment, when the signal is passed through a lowpass filter of 30 kHz, a signal averaged by the time corresponding to the period of the frequency of about 50 kHz is obtained, as already described. This is about ¹⁄₁₀ of the period of meandering shown in FIG. 9, and about 100 pits appear in this period. Therefore, if the ratio of mixture is adjusted such that the ratio of mixture between the shallow and deep pits are not 1:1 among the pits of about this number, the tracking servo signal never attains to 0, and the tracking servo signal of a constant polarity can be obtained.

Figure 10:
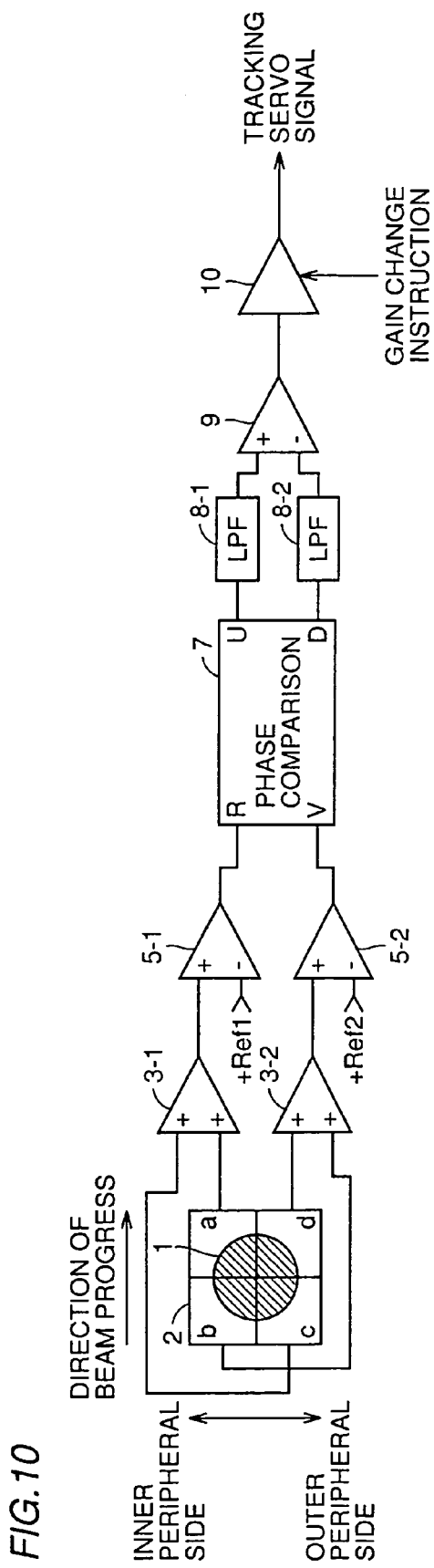
FIG. 10 is a block diagram representing a circuit configuration of a main portion of the optical disk reproducing apparatus in accordance with the sixth embodiment of the present invention.

The actual method of tracking the optical disk on which the ratio of mixture between the pits having the depth D1 and having the depth D2 adjusted to obtain the tracking servo signal of not 0 will be described. FIG. 10 is a block diagram representing a circuit configuration of a main portion of the optical disk reproducing apparatus in accordance with the sixth embodiment, executing the tracking method. First, when the disk having the ratio of mixture of the pits of respective depths is adjusted to obtain the DPD signal having constant amplitude through the optical disk is to be tracked, one fixed value may be used as the gain for the tracking servo. In a disk on which DPD signal has different amplitudes portion by portion on the disk is to be tracked, a gain change instruction in accordance with the change in the DPD signal amplitude, that is, the change in the tracking servo signal may be applied from a control unit, not shown, to a gain variable amplifier 10 to which the DPD signal that has passed through LPFs 8-1 and 8-2 is input, so that the magnitude of the resulting tracking servo signal is made approximately constant for the overall disk, as shown in FIG. 10.

Particularly, the value of the gain may be changed in a positive value when the DPD signal obtained from shallow pits having the depth D1 is dominant, and the gain may be changed in a negative value when the DPD signal obtained from deep pits having the depth D2 is dominant. Generally, when the change in the amplitude of the tracking servo signal is within 3 dB, it is possible to address with the gain of one fixed value. When there is a change in the amplitude exceeding this value, it becomes necessary to change the gain value corresponding to the change in the amplitude.

The position (timing) at which the value of gain is to be changed can be obtained from address information of the disk having the prescribed format. For example, assuming a disk having such a format that shallow pits and deep pits exist mixedly with a certain ratio within continuous regions (sectors) starting from the n-th sector and reaching the m-th sector (n<m) and only shallow pits are formed in other regions, it would be necessary to change the gain value at the head of the n-th sector and at the head of the m-th sector when reading data sequentially from the sectors in the ascending sector number. Such a gain change instruction is supplied from a controller (CPU), not shown, of the disk reproducing apparatus, which monitors the address (sector) of the disk.

Figure 11:
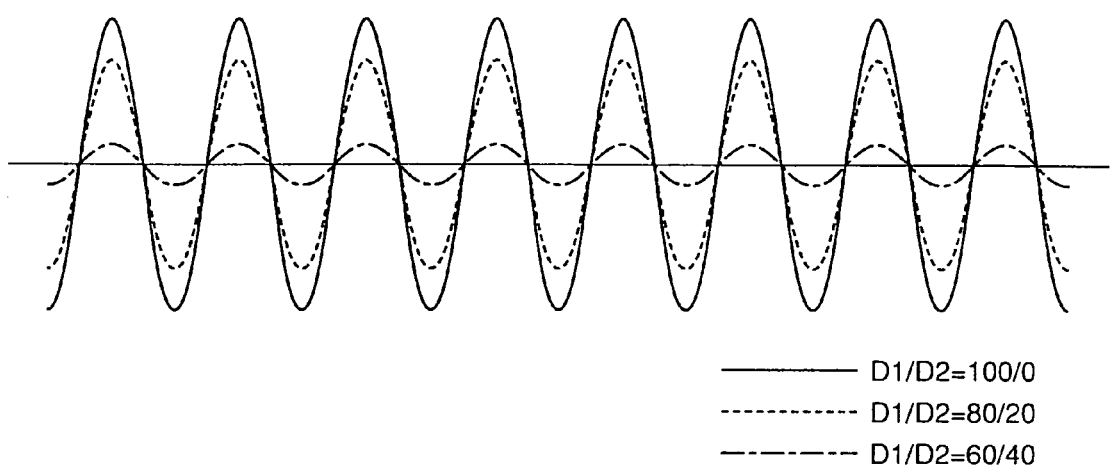
FIG. 11 is a waveform diagram representing the relation between the amplitude of the push-pull signal and the ratio of mixture of the pits having different depths.
Figure 12:
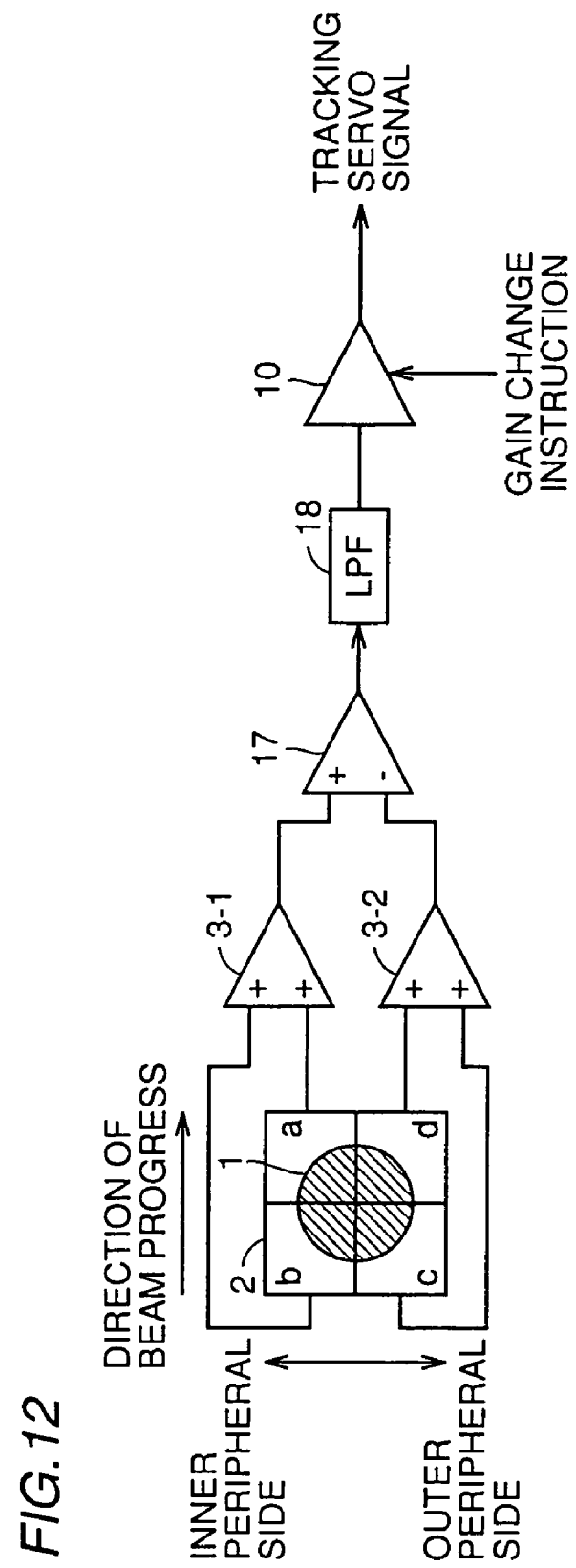
FIG. 12 is a block diagram representing a circuit configuration of a main portion of the optical disk reproducing apparatus in accordance with the seventh embodiment of the present invention.

Generation of the tracking servo signal using the push-pull signal will be described. FIG. 11 is a waveform diagram representing track crossing of the tracking servo signal obtained by the push-pull method, monitored while variously changing the ratio of mixture of the pits having respective depths. As in FIG. 7, the amplitude of the push-pull signal changes dependent on the ratio of mixture of the pits of respective depths, in FIG. 11. Therefore, as in the case of the DPD signal described above, a tracking servo signal that is not 0 can be obtained by adjusting the ratio of mixture of the pits of respective depths, such that one polarity of the push-pull signal becomes dominant. FIG. 12 is a block diagram representing a circuit configuration of a main portion of the optical disk reproducing apparatus in accordance with the seventh embodiment, in which a stable tracking servo signal can be obtained even from a disk on which the amplitude of the push-pull signal differ portion by portion on the disk. As already described with reference to FIG. 10, by amplifying the push-pull signal with an appropriate gain that changes corresponding to the change in the amplitude, an almost constant tracking servo signal can be obtained, enabling stable tracking servo control. The control of the variable gain is performed by a control unit, not shown, based on the change in the amplitude of the tracking servo signal obtained by time-averaging the signal corresponding to the period of the frequency of about 50 kHz, as already described.

Figure 13:
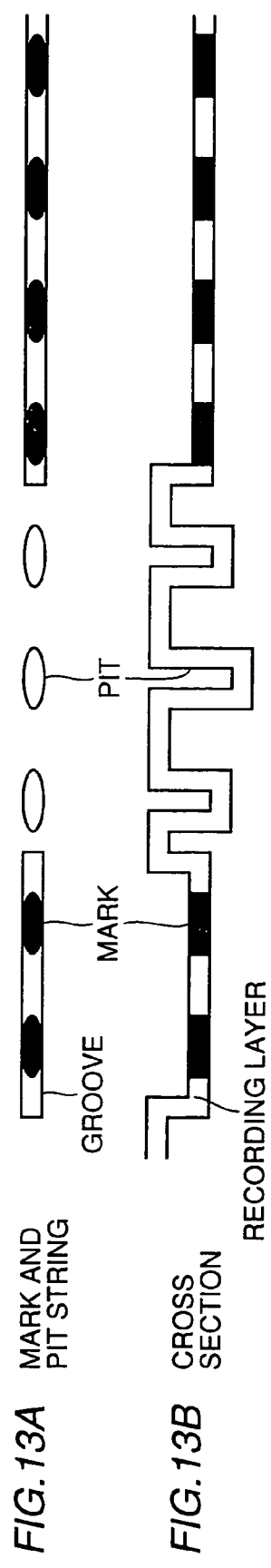
FIGS. 13A and 13B are schematic illustrations showing a structure of a modification of the optical disk in accordance with the fifth embodiment of the present invention.

Though the optical disk described above has a track consisting of pits only, the track is not necessarily consist of pits only. As shown in the plan view of FIG. 13A and the cross sectional view of FIG. 13B, the disk may have a track including both the pits and the recording marks. As the DPD signal can be obtained from the recording marks as well as from the pits, the tracking servo signal can be obtained in accordance with the DPD method (based on the DPD signal) when the ratio of mixture between the pits and the recording marks is adjusted such that one polarity of the DPD signal is dominant where pits and recording marks exist mixedly. When the amplitude of the DPD signal changes portion by portion on the disk, it is possible to obtain an almost constant tracking servo signal over the entire disk, by changing the gain portion by portion.

Figure 14:
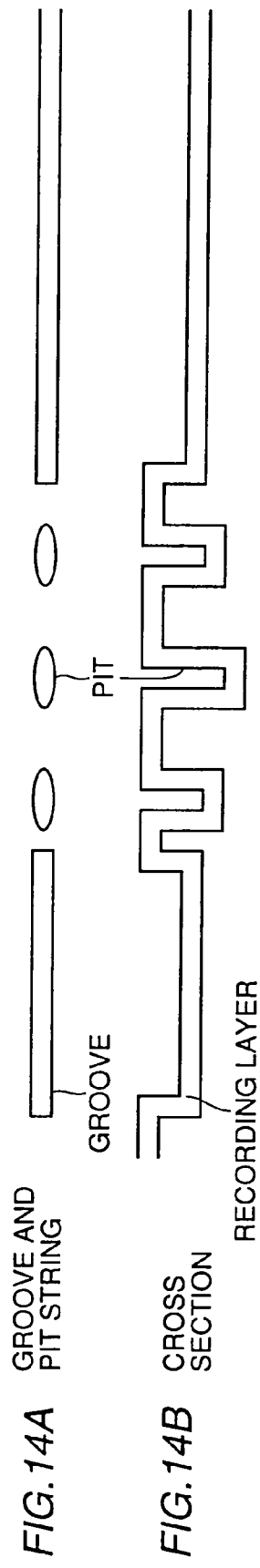
FIGS. 14A and 14B are schematic illustrations showing a structure of another modification of the optical disk in accordance with the fifth embodiment of the present invention.

Similarly, the optical disk described above may have a track including pits and grooves, as represented by the plan view of FIG. 14A and the cross sectional view of FIG. 14B. As the push-pull signal can be obtained from the groove as well as from the pits, the tracking servo signal can be obtained in accordance with the push-pull method (based on the push-pull signal), when the ratio of mixture between the pits and the grooves is adjusted such that one polarity of the push-pull signal is dominant, where pits and grooves exist mixedly. When the amplitude of the push-pull signal changes portion by portion on the disk, it is possible to obtain an almost constant tracking servo signal over the entire disk, by changing the gain portion by portion. The relation between the pits and grooves also apply to the relation between the pits and lands.

Figure 15:
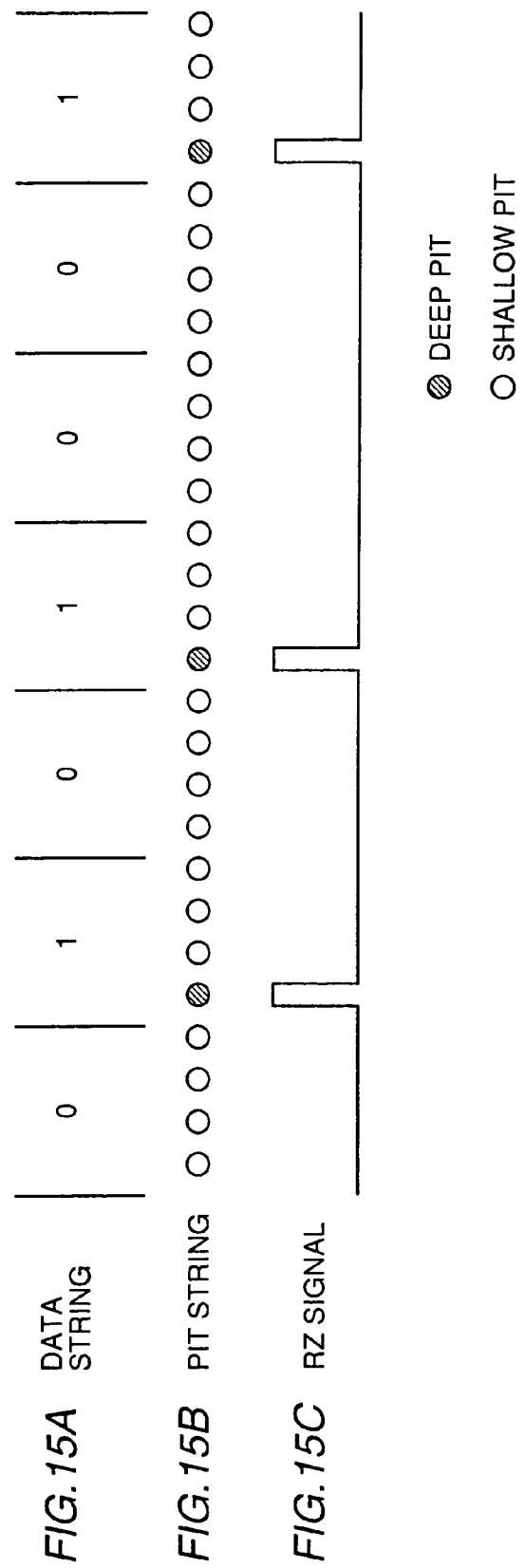
FIGS. 15A to 15C are timing charts representing the method of modulation used in the optical disk in accordance with the present invention.

The adjustment of the ratio of mixture of the pits having respective depth may be attained by various methods dependent on the method of data modulation. An example will be described in the following. FIGS. 15A to 15C are timing charts representing an example where Return to Zero (RZ) modulation recording is used. As shown in FIGS. 15A and 15B, it is assumed that four pits form one unit of data, and RZ modulation recording is performed. It is assumed that when the header pit of the four pits is shallow, the data represents 0, and when the header pit is deep, the data represents 1. Further, it is determined that all the pits other than the header pit of each data unit are formed to be the shallow pits. By utilizing such a method of modulation, the ratio of mixture of the pit depth can be made different from 1:1 without fail, and hence a tracking servo signal that is not 0 can be obtained.

The wavelength of the light, the optical system, the thickness of the disk, the pit length, the mark length, the track pitch, the linear velocity, the response speed of the actuator and the like in accordance with the embodiments above are not limited to those described above, and appropriate values may be selected dependent on case. Further, the method of modulation is not limited to the RZ method described above. For example, when Digital Sum Value (DSV) method is used and modulation is controlled so that DSV has a value other than 0 while monitoring the DC component of the modulation signal in the depth direction of the pit, a tracking servo signal can be obtained without fail.

As described above, according to the fifth to seventh embodiments of the present invention, on optical disks having pits, recording marks, grooves/lands and the like existing mixedly from which DVD signals or push-pull signals of different polarities are obtained, the ratio of mixture of the pits, marks, grooves/lands and the like is adjusted such that the tracking servo signal can be obtained without fail by time-averaging these signals in a prescribed time period shorter than the response time of the tracking servo. As a result, a tracking servo signal that is not 0 can be obtained from such optical disks, enabling correct and stable tracking servo control.

As the gain of the tracking servo is changed in accordance with the magnitude of the tracking servo signal obtained by averaging the DPD signal or the push-pull signal in a prescribed time period shorter than the response time of the tracking servo, a stable tracking servo signal can be obtained constantly, enabling stable tracking servo control.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical disk reproducing apparatus for irradiating a surface of an optical disk with an optical beam and for reproducing information recorded on said surface of said optical disk by the formation of a string of a plurality of pits each having one of at least two different depths in said surface of said optical disk, said apparatus comprising:
   a photoreceptor element for detecting a quantity of said optical beam reflected from said optical disk;
   a pit depth detecting unit for detecting a depth of each said pit based on said quantity of said optical beam detected by said photoreceptor element;
   a servo signal generating unit for generating a tracking servo signal for controlling said optical beam to track said pit string according to a detected deviation between said optical beam and said pit string based on said quantity of said optical beam detected by said photoreceptor element; and
   an output control unit for controlling an output tracking servo signal generated by said servo signal generating unit based on the result of said detection by said pit depth detecting unit;
   wherein said output control unit controls the output of said servo signal generating unit such that a tracking servo signal is output by said servo signal generating unit for causing said optical beam to track said pit string when a pit having a depth that is to be reproduced is being tracked, and said output tracking servo signal also is stored and later output for causing said optical beam to track said pit string when a pit of a different depth is being tracked, based on the result of detection by said pit depth detecting unit.

2. The optical disk reproducing apparatus according to claim 1, wherein said pit depth detecting unit detects a depth of each pit based on a difference in the quantity of said optical beam reflected from said pit string along a tangential direction.

3. The optical disk reproducing apparatus according to claim 2, wherein said pit depth detecting unit includes
   a first detecting unit for generating a first signal representing a quantity of said optical beam reflected from said pit string,
   a second detecting unit for generating a second signal indicative of a difference in the quantity of said optical beam reflected from said pit string along the tangential direction, and a third detecting unit for generating a third signal indicative of the depth of each pit, based on said first and second signals.

4. The optical disk reproducing apparatus according to claim 3, wherein said third detecting unit includes
a first comparing circuit for comparing said second signal with a first reference value,
a second comparing circuit for comparing said second signal with a second reference value, and
a holding circuit for holding results of comparison by said first and second comparing circuits, at a time of change of said first signal.

5. The optical disk reproducing apparatus according to claim 1, wherein said servo signal generating unit generates said tracking servo signal by detecting phase differences in successive quantities of said reflected optical beam detected by said photoreceptor element.

6. The optical disk reproducing apparatus according to claim 1, wherein said servo signal generating unit generates said tracking servo signal by detecting a difference in a quantity of said reflected optical beam detected by said photoreceptor element from an inner peripheral side and an outer peripheral side of said optical disk.

7. The optical disk reproducing apparatus according to claim 1, wherein said photoreceptor element has a cross-shape, divided into two along the tangential direction and divided into two along the radial direction of said optical disk.

8. The optical disk reproducing apparatus according to claim 1, wherein said photoreceptor element is divided into two along the tangential direction of said optical disk, one of the two-split photoreceptor elements is further divided into two along the tangential direction of said optical disk, and the other of the two-split photoreceptor elements is further divided into two along the radial direction of said optical disk.

9. An optical disk reproducing apparatus for reproducing by optical beam irradiation information recorded on an optical disk by the formation of a track having a plurality of recessed and protruded portions, said apparatus comprising:
a photoreceptor element for detecting a quantity of said optical beam reflected from said optical disk;
a signal detecting unit for detecting a signal indicative of a deviation between said optical beam and said track based on said reflected quantity of said optical beam detected by said photoreceptor element, said recessed and protruded portions of said track of said optical disk being disposed along said track in mixed relation with one another such that said signal based on said reflected quantity of said optical beam from said recessed portions is detected with a different polarity than said signal based on said reflected quantity of said optical beam from said protruded portions;
a servo signal generating unit for generating a tracking servo signal by time-averaging said detected signal in a time period shorter than a response time of a tracking servo when said optical beam tracks said track, and a ratio of recessed and protruded portions is set such that said generated tracking servo signal has one of said different polarities; and
a gain changing unit for changing a gain in said tracking servo signal, in accordance with a magnitude of said generated tracking servo signal.

10. The optical disk reproducing apparatus according to claim 9, wherein said recessed and protruded portions of said track are pits.

11. The optical disk reproducing apparatus according to claim 9, wherein the recessed and protruded portions of said track include a recording mark.

12. The optical disk reproducing apparatus according to claim 9, wherein the recessed and protruded portions of said track include a groove and/or a land.

13. The optical disk reproducing apparatus according to claim 9, wherein said signal detecting unit detects said signal based on a phase difference in the quantity of said optical beam reflected from said recessed portions and from said protruded portions of said track of said optical disk.

14. The optical disk reproducing apparatus according to claim 9, wherein said signal detecting unit detects said signal based on a difference in quantity of said optical beam reflected from said recessed portions and from said protruded portions of said track of said optical disk between an inner peripheral side and an outer peripheral side of said optical disk.

15. A method of tracking a track located on an optical disk with an optical beam, said track including a plurality of recessed and protruded portions formed in mixed relation to one another thereon from which information may be reproduced using said optical beam, said method comprising the steps of:
detecting a quantity of said optical beam reflected from said optical disk;
detecting a signal indicative of a deviation between said optical beam and said track based on said detected reflected quantity of said optical beam, a portion of said detected signal based on quantities of said optical beam reflected from said recessed portions of said track having a different polarity than said detected signal based on quantities of said optical beam reflected from said protruded portions;
generating a tracking servo signal by time-averaging said detected signal in a time period shorter than a response time of a tracking servo when said optical beam tracks said track, such that a ratio of said portions of said detected signal based on reflected quantities of said optical beam from said recessed portions and said protruded portions of said track respectively during said time period is set such that said generated tracking servo signal has one of said different polarities; and
changing a gain of said tracking servo in accordance with a magnitude of said generated tracking servo signal.

16. The method according to claim 15, wherein said recessed and protruded portions of said track of said optical disk are pits.

17. The method according to claim 15, wherein said recessed and protruded portions of said track of said optical disk include a recording mark.

18. The method according to claim 15, wherein said recessed and protruded portions of said track of said optical disk include a groove and/or a land.

19. The method according to claim 15, wherein in said step of detecting said signal, said signal is detected based on a phase difference in the quantity of said optical beam reflected from said recessed portions and the quantity of said optical beam reflected from said protruded portions of said track of said optical disk, respectively.

20. The method according to claim 15, wherein in said step of detecting said signal, said signal is detected based on a difference in the quantity of said optical beam reflected from said recessed portions and said protruded portions of said track of said optical disk between an inner peripheral side and an outer peripheral side of said optical disk.

* * * * *